(12) United States Patent
Deng et al.

(10) Patent No.: US 9,544,612 B2
(45) Date of Patent: Jan. 10, 2017

(54) PREDICTION PARAMETER INHERITANCE FOR 3D VIDEO CODING

(71) Applicant: Intel Corporation, Santa Clara, CA (US)

(72) Inventors: Zhipin Deng, Beijing (CN); Yi-Jen Chiu, San Jose, CA (US); Lidong Xu, Beijing (CN); Wenhao Zhang, Beijing (CN); Yu Han, Beijing (CN); Xiaoxia Cai, Beijing (CN)

(73) Assignee: Intel Corporation, Santa Clara, CA (US)

( * ) Notice: Subject to any disclaimer, the term of this patent is extended or adjusted under 35 U.S.C. 154(b) by 604 days.

(21) Appl. No.: 13/681,542

(22) Filed: Nov. 20, 2012

(65) Prior Publication Data

US 2014/0098189 A1   Apr. 10, 2014

Related U.S. Application Data

(60) Provisional application No. 61/709,688, filed on Oct. 4, 2012.

(51) Int. Cl.
*H04N 19/176* (2014.01)
*H04N 19/30* (2014.01)
(Continued)

(52) U.S. Cl.
CPC .......... *H04N 19/51* (2014.11); *H04N 13/0048* (2013.01); *H04N 19/176* (2014.11);
(Continued)

(58) Field of Classification Search
CPC ........................... H04N 13/0048; H04N 19/51
See application file for complete search history.

(56) References Cited

U.S. PATENT DOCUMENTS

2004/0150639 A1   8/2004   Park et al.
2005/0180340 A1   8/2005   Lee
(Continued)

FOREIGN PATENT DOCUMENTS

| JP | 2012010053 | 1/2012 |
|----|------------|--------|
| WO | 2014004657 | 1/2014 |
| WO | 2014/055140 A1 | 4/2014 |

OTHER PUBLICATIONS

International Preliminary Report on Patentability received for PCT Patent Application No. PCT/US2013/046128, mailed on Apr. 7, 2015, 6 pages.

(Continued)

*Primary Examiner* — Jay Patel
*Assistant Examiner* — Irfan Habib
(74) *Attorney, Agent, or Firm* — Green, Howard & Mughal LLP

(57) ABSTRACT

A three-dimensional (3D) video codec encodes multiple views of a 3D video, each including texture and depth components. The encoders of the codec encode video blocks of their respective views based on a set of prediction parameters, such as quad-tree split flags, prediction modes, partition sizes, motion fields, inter directions, reference indices, luma intra modes, and chroma intra modes. The prediction parameters may be inherited across different views and different ones of the texture and depth components.

35 Claims, 15 Drawing Sheets

(51) Int. Cl.
*H04N 19/51* (2014.01)
*H04N 13/00* (2006.01)
*H04N 19/597* (2014.01)
*H04N 19/463* (2014.01)
*H04N 19/119* (2014.01)
*H04N 19/122* (2014.01)
*H04N 19/61* (2014.01)
*H04N 19/96* (2014.01)
*H04N 19/103* (2014.01)
*H04N 19/157* (2014.01)
*H04N 19/187* (2014.01)

(52) U.S. Cl.
CPC ........... *H04N 19/30* (2014.11); *H04N 19/463* (2014.11); *H04N 19/597* (2014.11); *H04N 19/103* (2014.11); *H04N 19/119* (2014.11); *H04N 19/122* (2014.11); *H04N 19/157* (2014.11); *H04N 19/187* (2014.11); *H04N 19/61* (2014.11); *H04N 19/96* (2014.11)

(56) References Cited

U.S. PATENT DOCUMENTS

| | | | |
|---|---|---|---|
| 2005/0276323 A1 | 12/2005 | Martemyanov et al. | |
| 2010/0061447 A1 | 3/2010 | Tu et al. | |
| 2010/0165077 A1* | 7/2010 | Yin | H04N 19/597 348/42 |
| 2012/0082223 A1* | 4/2012 | Karczewicz | H04N 19/196 375/240.12 |
| 2012/0082224 A1* | 4/2012 | Van Der Auwera | H04N 19/176 375/240.12 |
| 2012/0229602 A1 | 9/2012 | Chen et al. | |
| 2012/0236934 A1 | 9/2012 | Chen et al. | |
| 2012/0269458 A1* | 10/2012 | Graziosi | H04N 19/597 382/299 |
| 2013/0009955 A1* | 1/2013 | Woo | H04N 13/0011 345/419 |
| 2013/0069942 A1* | 3/2013 | Woo | H04N 13/0011 345/419 |
| 2013/0128965 A1* | 5/2013 | Zhang | H04N 19/00569 375/240.12 |
| 2013/0202194 A1* | 8/2013 | Graziosi | G06T 3/403 382/154 |
| 2013/0215976 A1* | 8/2013 | Kim | H04N 19/176 375/240.25 |
| 2013/0222534 A1* | 8/2013 | Rusanovskyy | H04N 13/0011 348/43 |
| 2013/0279576 A1* | 10/2013 | Chen | H04N 19/00684 375/240.12 |
| 2014/0168362 A1* | 6/2014 | Hannuksela | H04N 13/0048 348/43 |
| 2014/0205007 A1* | 7/2014 | Takahashi | H04N 13/0048 375/240.03 |
| 2014/0286408 A1* | 9/2014 | Zhang | H04N 19/159 375/240.12 |
| 2015/0063455 A1* | 3/2015 | Yie | H04N 13/0022 375/240.12 |
| 2015/0085933 A1* | 3/2015 | Yie | H04N 13/0048 375/240.16 |
| 2015/0085935 A1* | 3/2015 | Chen | H04N 19/597 375/240.16 |

OTHER PUBLICATIONS

Schwarz, Heiko et al. "Test Model under Consideration for HEVC based 3D video coding v3.0," ISO/IEC JTC1/SC29/WG11 MPEG2012/N12744, Apr. 2012.

International Search Report and Written Opinion received for Patent Application No. PCT/US2013/046128, mailed on Nov. 19, 2013, 10 pages.
International Preliminary Report on Patentablity for International Patent Application No. PCT/US2013/046128, mailed on Apr. 16, 2015, 7 pages.
Office Action for Korean Patent Application No. 2015-7005729 issued on Nov. 13, 2015.
Bartnik, C. et al., "HEVC Extension for Multiview Video Coding and Multiview Video plus Depth Coding", ITU-Telecommunications Standardization Sector, Study Group 16, Question 6, Video Coding Experts Group (VCEG), 44nd Meeting: San Jose, CA, USA Feb. 3-10, 2012.
Non Final Notice of Reasons for Rejections mailed Jun. 21, 2016 for Japanese Patent Application No. 2015-535651.
Notice of Allowance for Korean Patent Application No. 2015-7005729, mailed Jun. 29, 2016.
Office Action for U.S. Appl. No. 14/578,990, notified on Jun. 23, 2016.
Search Report for European Patent Application No. 13843226.5, mailed on May 30, 2016.
Search Report for European Patent Application No. 15196491.3, mailed on Apr. 29, 2016.
Chiu, Yi-Jen et al., "3D-CE3.h related: Motion Parameter Inheritance Improvement", 102 MPEG Meeting; Oct. 15, 2012-Oct. 19, 2012; Shanghai; (Motion Picture Expert Group or ISO/IEC JTC1/SC29/WG11), No. m26773, Oct. 15, 2012.
Hannuksela, Miska M. , "3DV-ATM Slice Header Prediction", 99. MPEG Meeting; Jun. 2, 2012-Oct. 2, 2012; San Jose; (Motion Picture Expert Group or ISO/IEC JTC1/SC29/WG11); No. m23697, Feb. 1, 2012.
Konieczny, Jacek et al., "Depth-Enhanced Compression for 3D Video", Multimedia Telecommunications and Microelectronics, Poznań University of Technology, Poland; Visual Communications and Image Processing (VCIP), 2011 IEEE, Tainan, 2011, pp. 1-4.doi: 10.1109/VCIP.2011.6116058.
Schwarz, Heiko et al., "Description of 3D Video Coding Technology Proposal by Fraunhofer HHI (HEVC compatible, configuration B)", 98 MPEG Meeting; Nov. 28, 2011-Dec. 2, 2011; Geneva; (Motion Picture Expert Group or ISO/IEC JTC1/SC29/WG11), No. M22571, Nov. 22, 2011.
Schwarz, Heiko et al., "Test Model under Consideration for HEVC based 3D video coding", Retrieved from the Internet: URL:http//new.owieczka.net/wp-content/publication/2012/w12559.pdf; Feb. 29, 2012.
Takahashi, Yoshitomo et al., "Descriptions of 3D Video Coding Proposal (HEVC-Compatible Category) by Sony", 98 MPEG Meeting; Nov. 28, 2011-Dec. 2, 2011; Geneva; (Motion Picture Expert Group or ISO/IEC JTC1/SC29/WG11), No. m22566, Nov. 22, 2011.
Tech, Gerhard et al., "3D-HEVC Test Model 1", Joint Collaborative Team on 3D Video Coding extension Development of ITU-T SG 16 WP 3 and ISO/IEC JTC 1/SC 29/WG 11; 1st meeting: Stockholm SE, Jul. 16-20, 2012, 83 pages.
Non-Final Notice of Reasons for Rejection mailed Aug. 2, 2016, for JP Patent Application No. 2015-196090, Translation provided.
Notice of Allowance for U.S. Appl. No. 14/578,990, mailed on Oct. 21, 2016.
Notice of Preliminary Rejection, mailed Aug. 30, 2016, for Korean Patent Application No. 2015-7030487, Translation provided.
Bartnik, et al. "HEVC Extension for Multiview Video Coding and Multiview Video plus Depth Coding", ITU-Telecommunications Standardization Sector Video Coding Experts Group, VCEG-AR13 (Feb. 10, 2012), 44nd Meeting: San Jose, CA, USA, Feb. 3-10, 2012.

\* cited by examiner

Multi-view
Encoders

450 PPI Syntax

| PPI Flag(s) |
|---|
| indicates use of PPI at level of sequence/ view/ slice/ picture/ CU/ PU/ TU |

| PPI Direction |
|---|
| Indicates<br>- source (view, component, one or more blocks)<br>- recipient (view, component, block) |

| Inherited Prediction Parameters<br>(used to control encode/decode) |
|---|
| - Picture encoding structure, including quadtree structures, such as quadtree split flags defining CU/PU subdivision;<br>- inter, intra, and hybrid prediction modes;<br>- partition sizes and shapes (e.g., for PUs);<br>- motion vectors and fields;<br>- inter directions; reference indices;<br>- luma inter and intra (prediction) modes, &<br>- chroma inter and intra (prediction) modes |

FIG. 4B

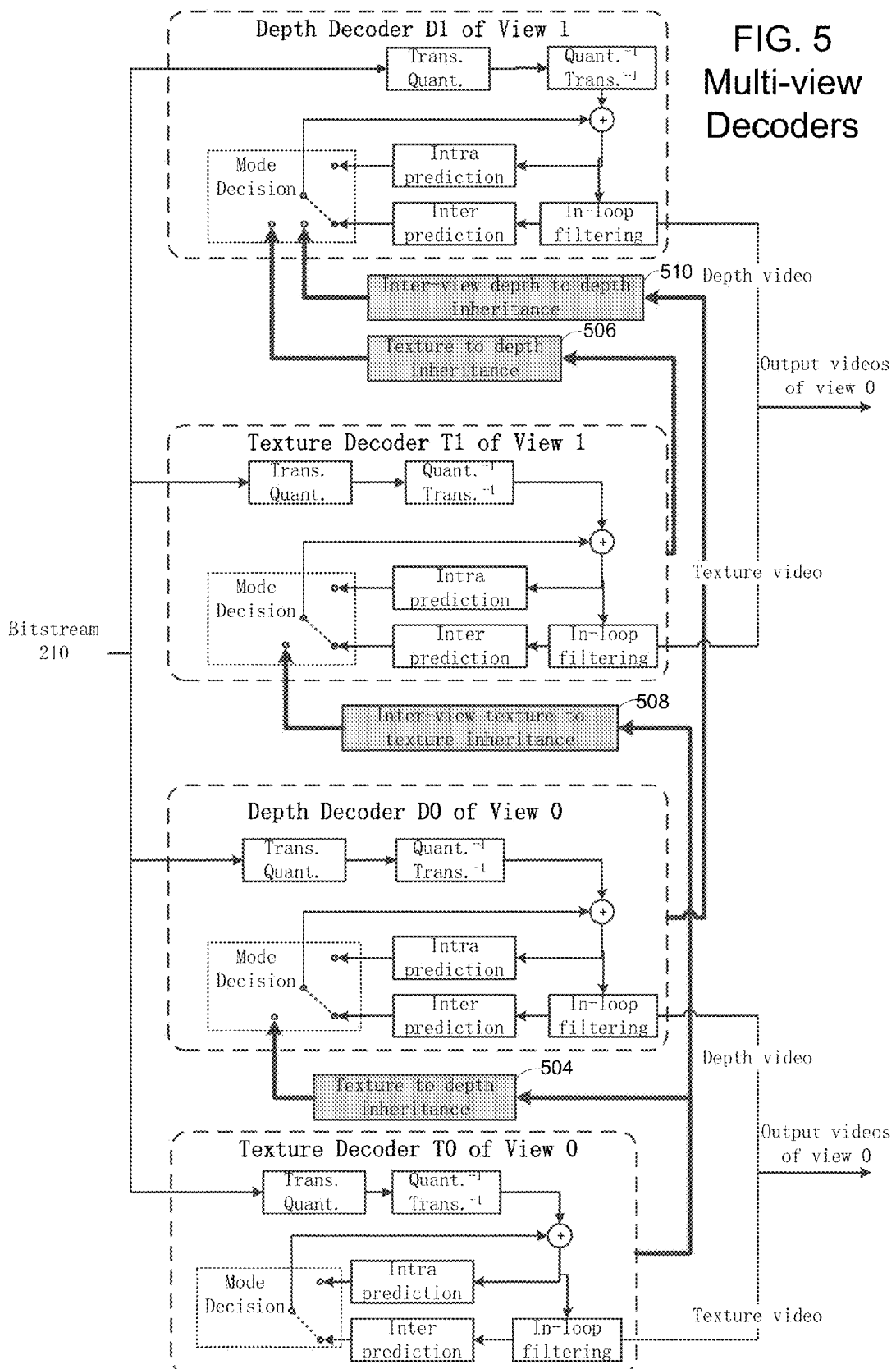
FIG. 5 Multi-view Decoders

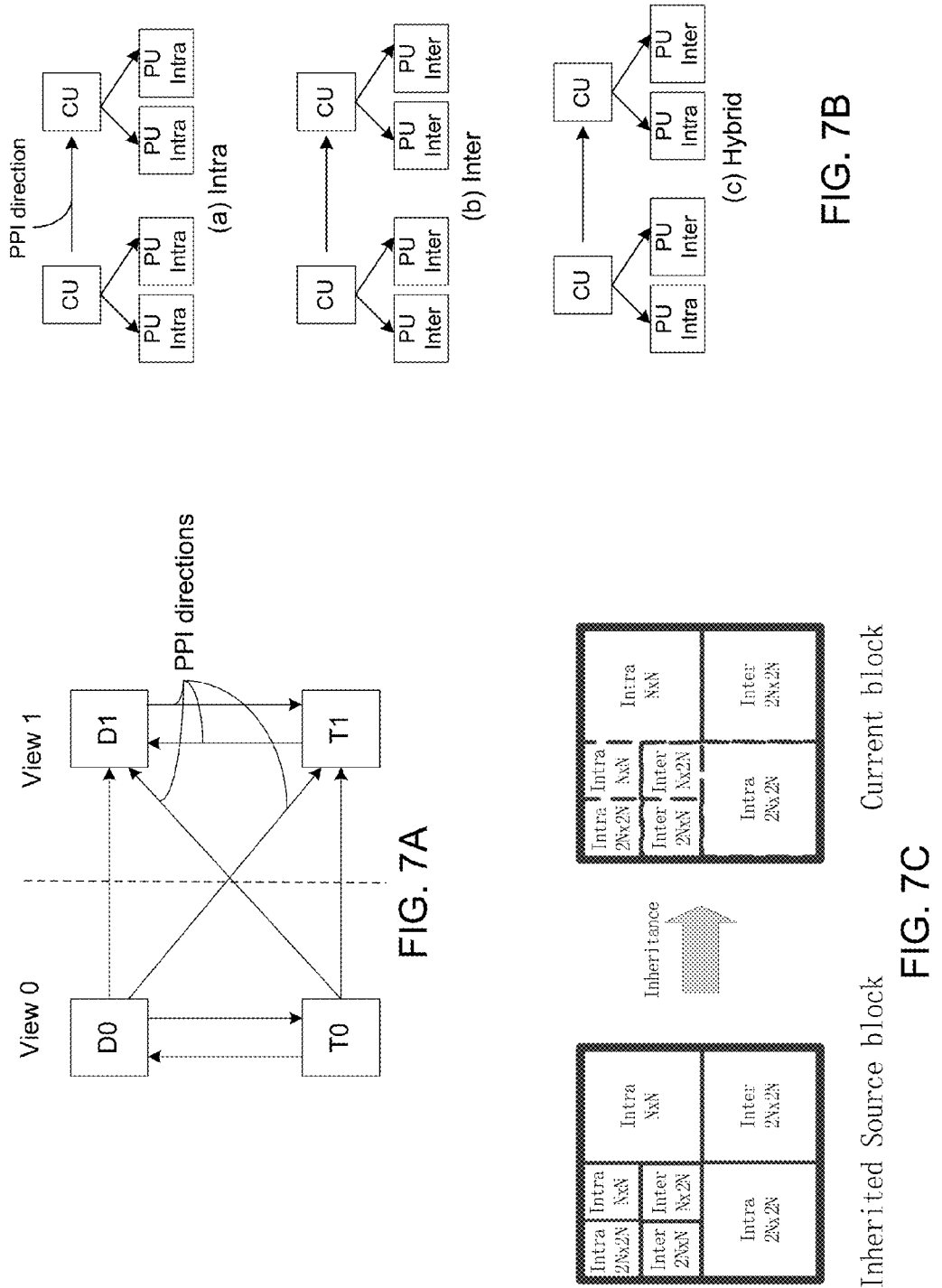

1000

Receiving an encoded video block of each of a texture component of a first view of multiple views of multi-view video, a depth component of the first view, a texture component of a second view of the multiple views, and a depth component of the second view — 1005

Determining whether each encoded video block is associated with a prediction parameter inheritance syntax (PPI) indicating that the respective encoded video block was encoded based on inherited prediction parameters — 1010

Decoding the respective encoded video block based on prediction parameters inherited from a selectable one of the other encoded video blocks indicated in the PPI syntax, if inherited prediction parameters are indicated for the respective encoded video block — 1015

Decoding the respective encoded video block based on prediction parameters that are not inherited if inherited prediction parameters are not indicated — 1020

FIG. 10

PREDICTION PARAMETER INHERITANCE FOR 3D VIDEO CODING

CROSS-REFERENCE TO RELATED APPLICATIONS

This application claims the benefit of U.S. Provisional Application Ser. No. 61/709,688, filed Oct. 4, 2012.

BACKGROUND

Three-dimensional (3D) video includes multiple views, each taken from a different camera perspective or angle. Each view includes a texture component (also referred to as a "texture view") and a depth map component. 3D video encoding includes encoding the multiple texture views and their associated depth maps, and then multiplexing the multiple encoded texture views and depth maps into a bit stream. Such 3D video encoding (or compression) employs different types of video prediction, such as inter and intra prediction, to eliminate redundancy in the texture and depth map components. Such prediction is performed using a set of prediction parameters to control the prediction. Current 3D coding standards and related techniques are inflexible and restrictive with regard to the conditions under which such prediction parameters may be inherited or passed between different contexts, such as different views and their corresponding texture/depth map components, to facilitate more efficient encoding and decoding processes.

BRIEF DESCRIPTION OF THE DRAWINGS/FIGURES

FIG. 4B is an illustration of PPI syntax that may be embedded into an encoded bitstream, according to an embodiment.

FIG. 5 is a detailed block diagram of an example two-view decoder system corresponding to the two-view encoder system of FIG. 4A.

FIG. 7A is a block diagram indicating PPI in various directions between different encoders of FIGS. 3 and 4, and the decoders of FIG. 5.

FIG. 7B is a series of block diagrams (a), (b), and (c) that illustrate inheritance of intra, inter, and hybrid prediction modes between sub-blocks of a video block.

FIG. 7C is a block diagram of another example PPI from a hybrid-encoded source block by a current block.

Figure 8A:
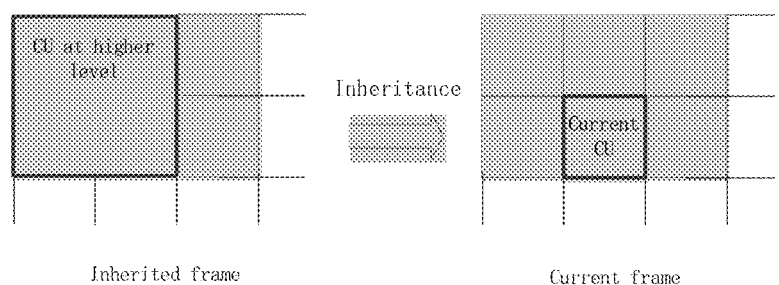
FIG. 8A is an example illustration of PPI at different levels of a coding tree hierarchy, namely, from a large CU to a small CU.
Figure 8B:
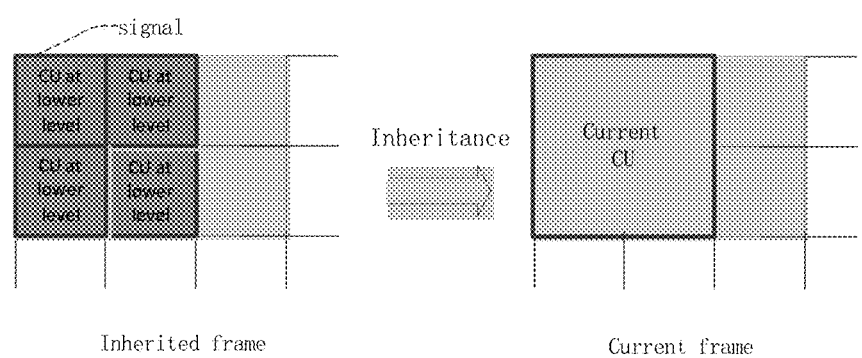

FIG. 8B another example illustration of PPI at different levels of a coding tree hierarchy, namely, from a small CU to a large CU.

Figure 9A:
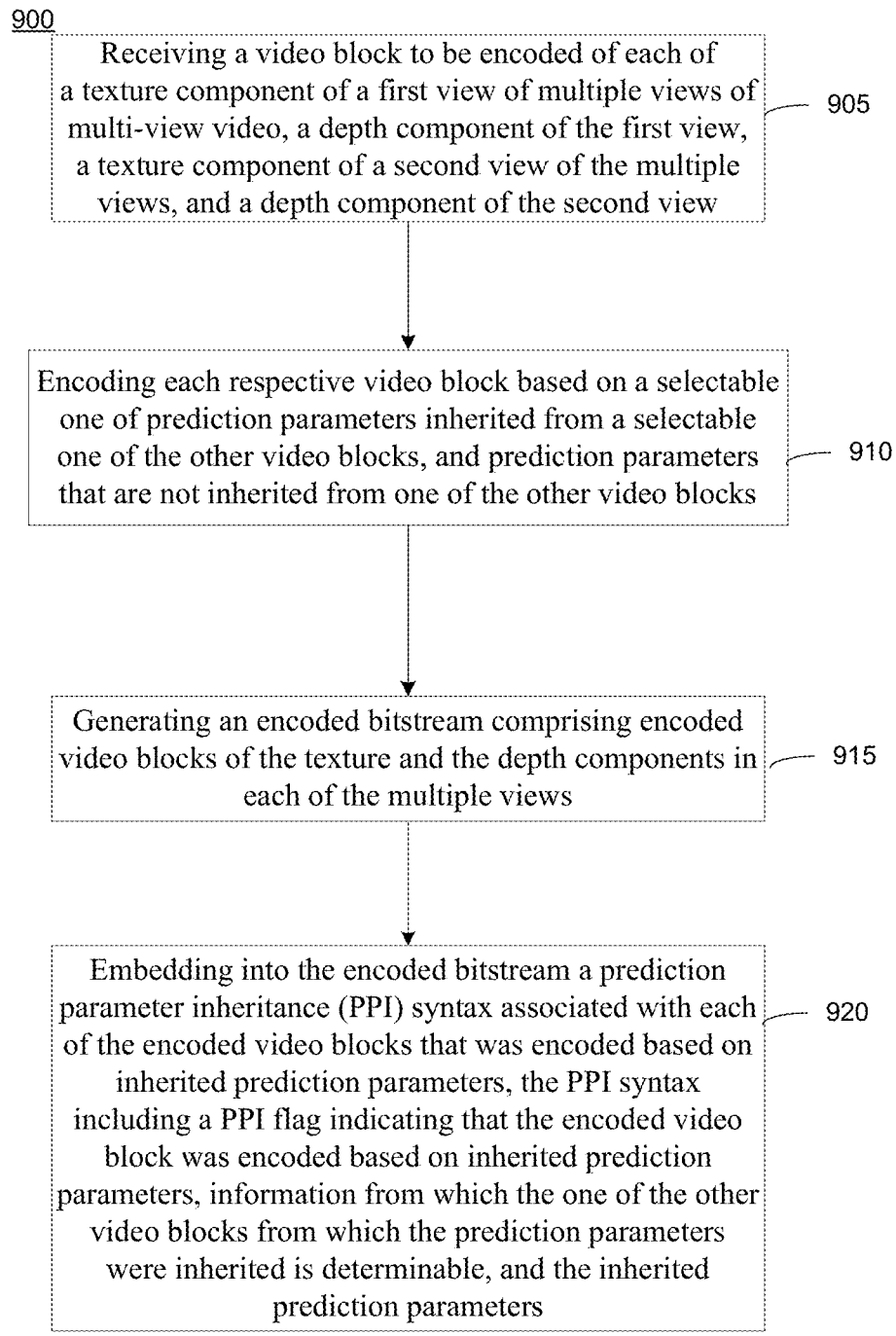

FIG. 9A is a flowchart of an example method of encoding multi-view texture and depth video/components using PPI.

Figure 9B:
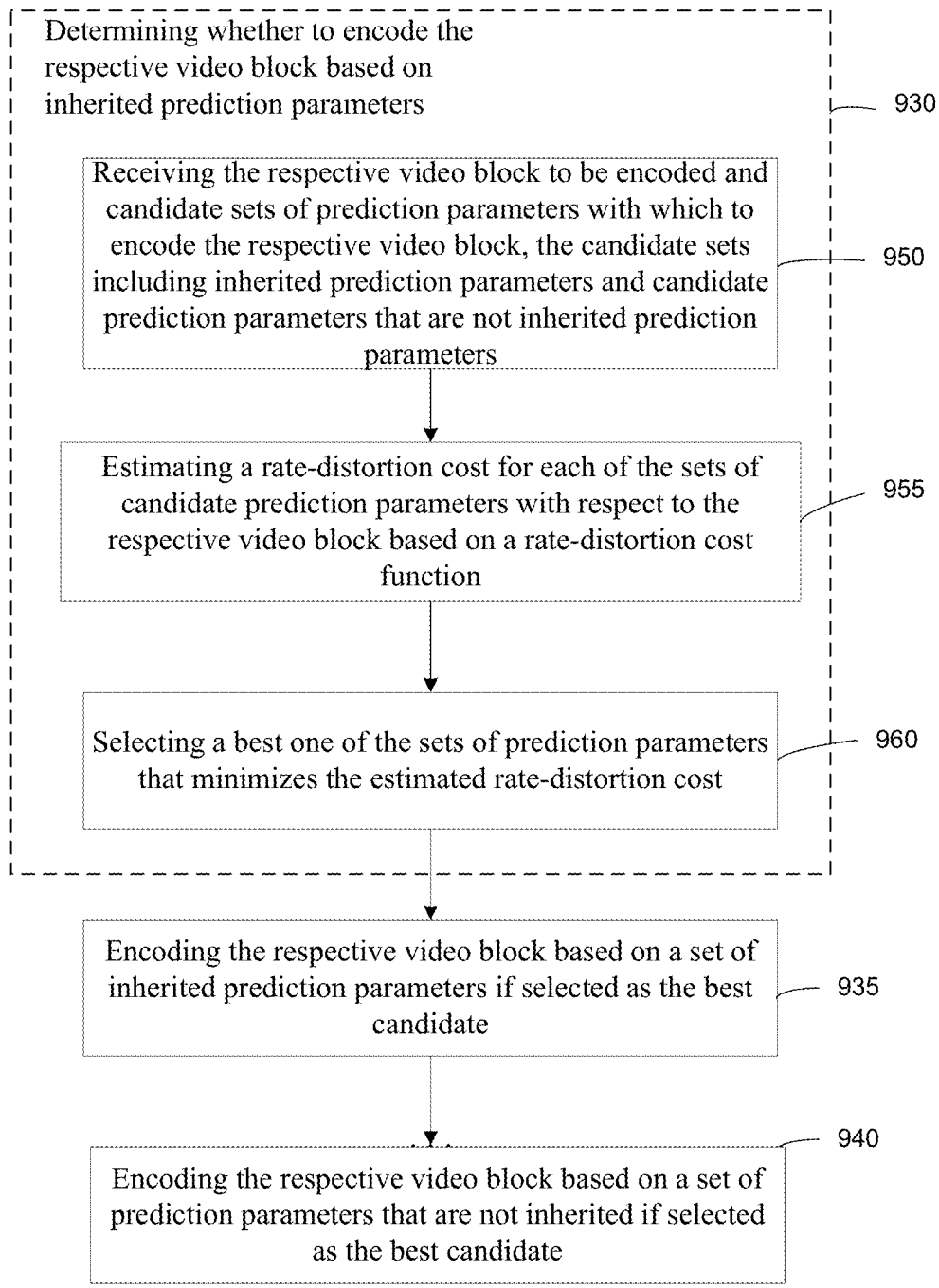

FIG. 9B is a flowchart of an example method expanding on the encoding of the method of FIG. 9A.

FIG. 10 is a flowchart of an example method of decoding encoded multi-view texture and depth video/components using PPI.

Figure 11:
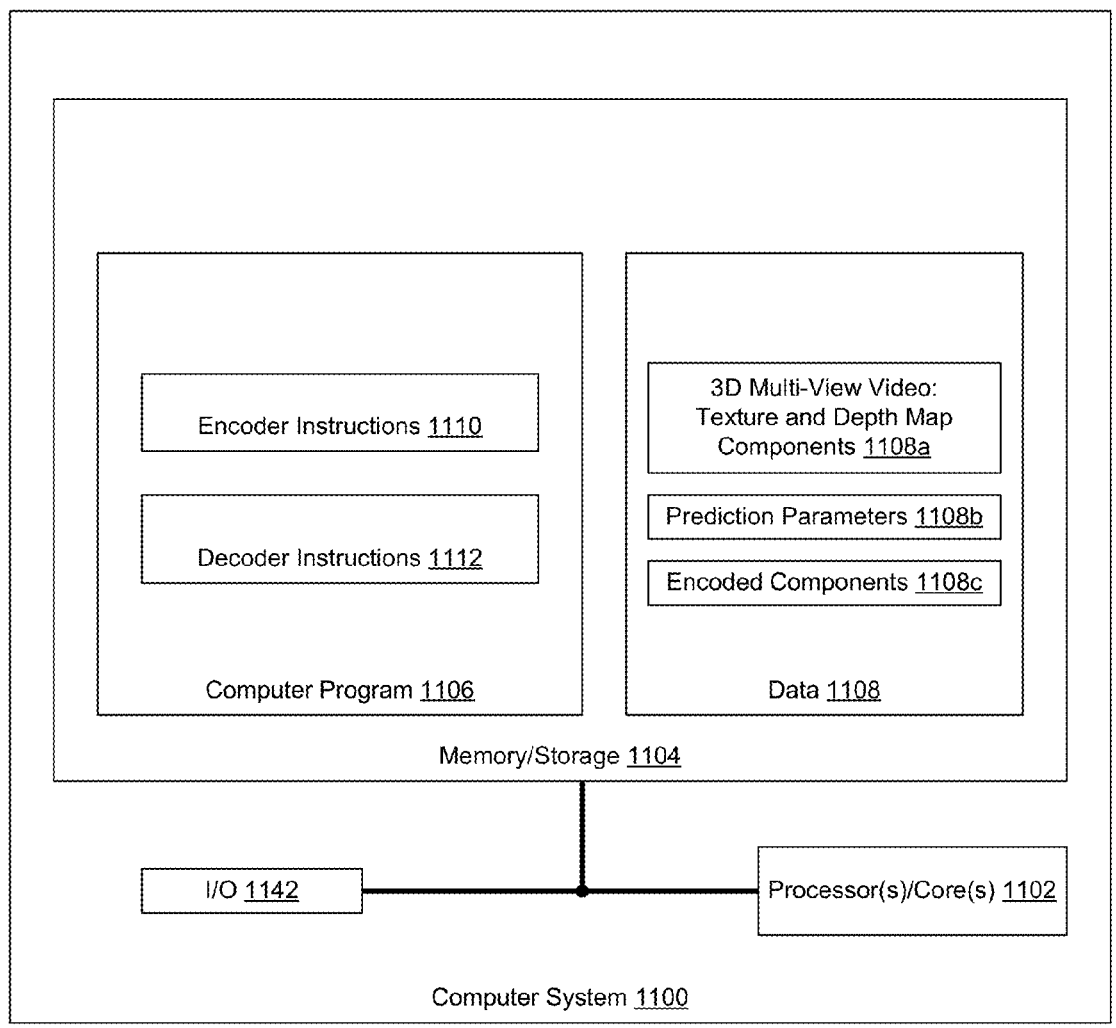

FIG. 11 is a block diagram of an example computer system configured to perform PPI embodiments in an encoder and a decoder.

Figure 12:
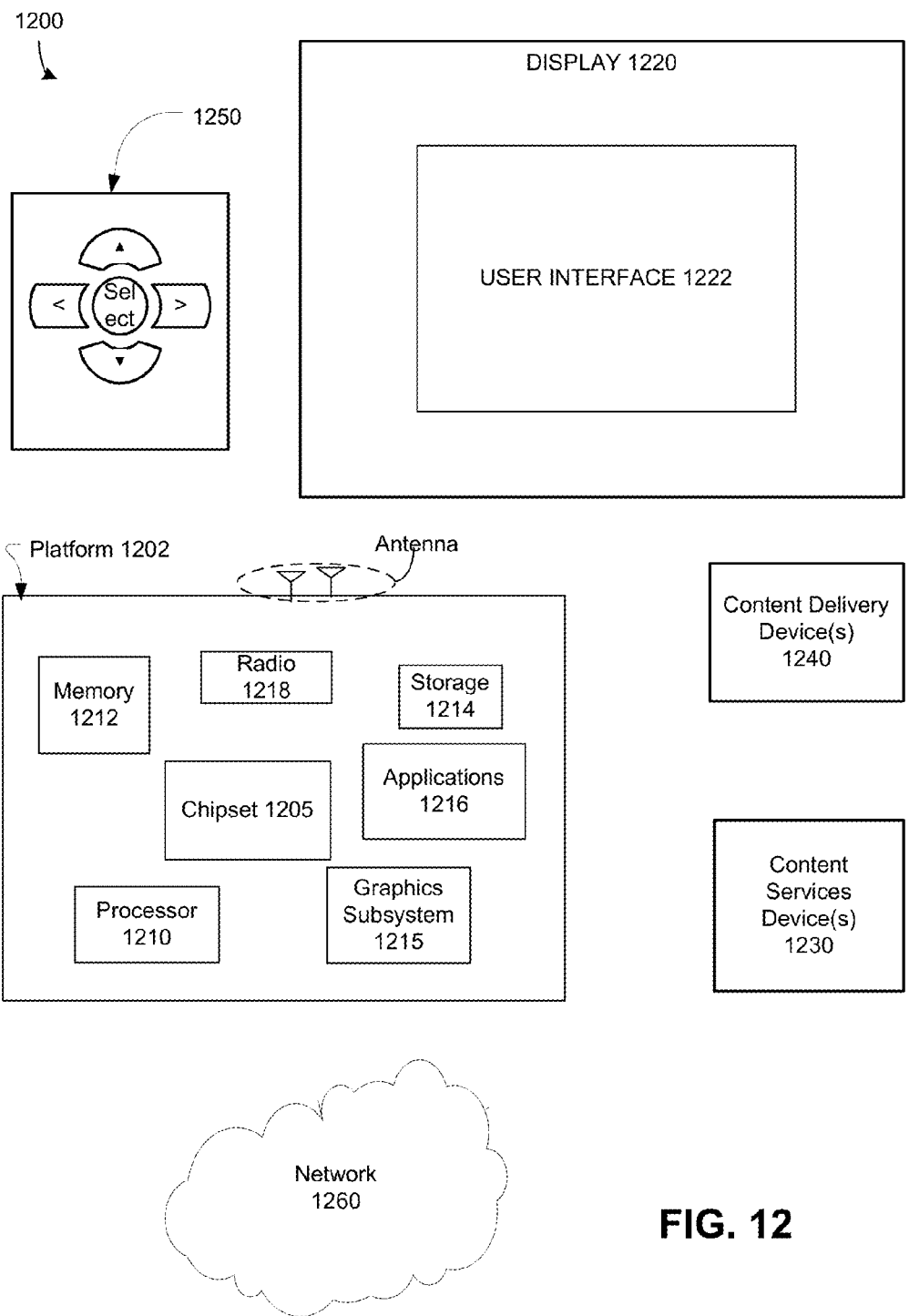

FIG. 12 illustrates an embodiment of a system in which PPI equipped encoder and PPI equipped decoder embodiments may be implemented.

Figure 13:
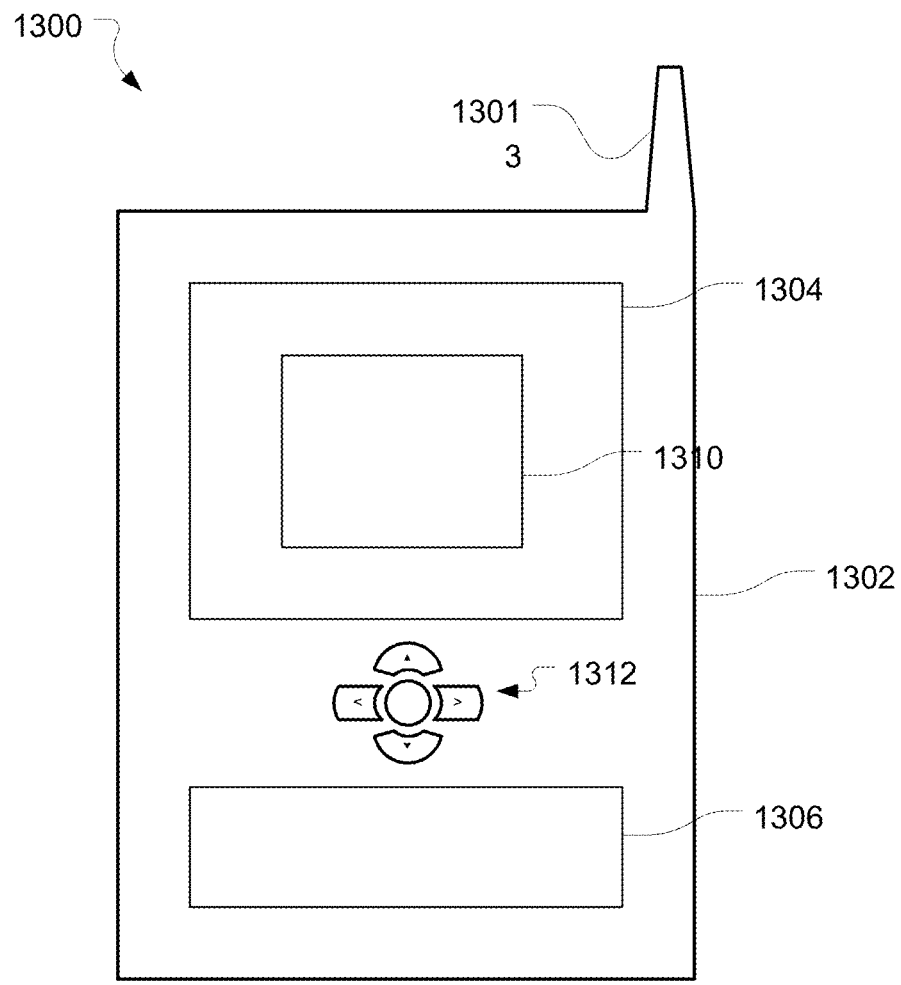

FIG. 13 illustrates embodiments of a small form factor device in which the system of FIG. 12 may be embodied.

In the drawings, the leftmost digit(s) of a reference number identifies the drawing in which the reference number first appears.

DETAILED DESCRIPTION

Three-Dimensional (3D) Video Coding (3DVC) is a video compression standard that targets a variety of 3D displays. 3DVC is under development in the International Organization for Standardization/International Electrotechnical Commission (ISO/IEC) Moving Picture Experts Group (MPEG). Two main branches of standardization include High Efficient Video Coding (HEVC), and 3DVC based on conventional H.264/AVC. The terms "coding" and "encoding" as used herein are synonymous and interchangeable. Described below are embodiments directed to prediction parameter inheritance (PPI) as used in multi-view 3D video encoding and decoding environments. The embodiments are described in connection with HEVC, although any other video standard may be used. Accordingly, an overview of relevant HEVC protocols is now presented to form a basis for the subsequently described PPI encoding and decoding embodiments.

HEVC Protocol Overview

To represent video content with various resolutions, HEVC defines a triplet of units, including a coding unit (CU), a prediction unit (PU), and a transform unit (TU). The CU is the basic unit of compression, and is broadly analogous to the concept of a macroblock of the H.264 standard, but is more flexible. The PU is a unit of inter/intra prediction and there may be multiple PUs in a single CU. The TU is a unit of transform, and can include one or more PUs. Accordingly, a CU may include multiple PUs and TUs that are associated with that CU.

A video comprises a sequence of video frames or pictures. Each picture may be partitioned into one or more slices. Under HVEC, each slice may be divided into a sequence of tree blocks, or largest coding units (LCUs), that include both luma and chroma samples. An LCU has a similar purpose as a macroblock. A slice includes a number of consecutive non-overlapping LCUs in coding order. Each LCU may be split or subdivided into a hierarchy of CUs according to a recursive quadtree structure. For example, an LCU, as a root node of a quadtree, may be split into four child nodes, and each child node may in turn be a parent node and be split into another four child nodes. The splitting is accomplished using quadtree split flags. A final, un-split child or terminal node, as a leaf node of the quadtree, comprises a coding node, i.e., a coding video block. A size of the CU may range from 8×8 pixels up to the size of the LCU with a maximum of 64×64 pixels or greater. Syntax data associated with a coded bitstream may define the CU splitting, including a quadtree structure, a maximum number of times an LCU may be split, and sizes of the coding nodes.

Prediction methods are specified for terminal CUs that are not further split, i.e., the leaf nodes (coding nodes) of the CU hierarchical quadtree. The CU leaf nodes are split into basic units of prediction, referred to as the PUs. The PU specifies the method of prediction. Specifically, two primary parameters specify the prediction method associated with the PU: a prediction type/mode, and a PU splitting. The prediction mode (also referred to herein as the coding mode) is selected from one of intra prediction, inter prediction, and skip, for example. Intra prediction involves prediction of a current video block relative to other video blocks in the same picture. Inter prediction involves prediction of a current video block relative to temporally-spaced, i.e., earlier and/or later, adjacent pictures. A PU defining inter prediction for a current block includes a motion vector relative to a reference block. The data defining the motion vector may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A TU is used for the transform and quantization processes. A CU having one or more PUs may also include one or more transform units (TUs). Following prediction, residual values corresponding to the PU may be calculated. The residual values comprise pixel difference values between a current block of video data and a predictive block of video data. The residual values may be transformed into transform coefficients, quantized, and scanned using the TUs to produce serialized transform coefficients for entropy coding. The term "video block" or simply "block" is construed broadly herein depending on the context to mean any of (i) video information, at any level of division, to be encoded, (ii) encoded video information, at any level of division, to be decoded, and (iii) decoded video information resulting from the decoding process, where the level of division may be any of, e.g., a frame, a slice, an LCU, a CU (i.e., coding node or not), a PU, or a TU.

Syntax data associated with HEVC may describe partitioning of the LCU or the CU into lower level CUs in accordance with the quadtree structure, and then partitioning of the leaf node CUs into PUs. The syntax data describes the prediction mode (e.g., intra, inter, and skip) and PU splitting or size for the leaf nodes. The syntax data associated with a CU may also describe, for example, partitioning of the CU into one or more TUs, and the sizes and shapes of the TUs. Such syntax data is also referred to herein as "prediction parameters," the use of which control prediction of the video blocks associated with the leaf node level of the HEVC that are to be encoded. In other words, video blocks are encoded based on the prediction parameters associated with the video blocks.

Figure 1:
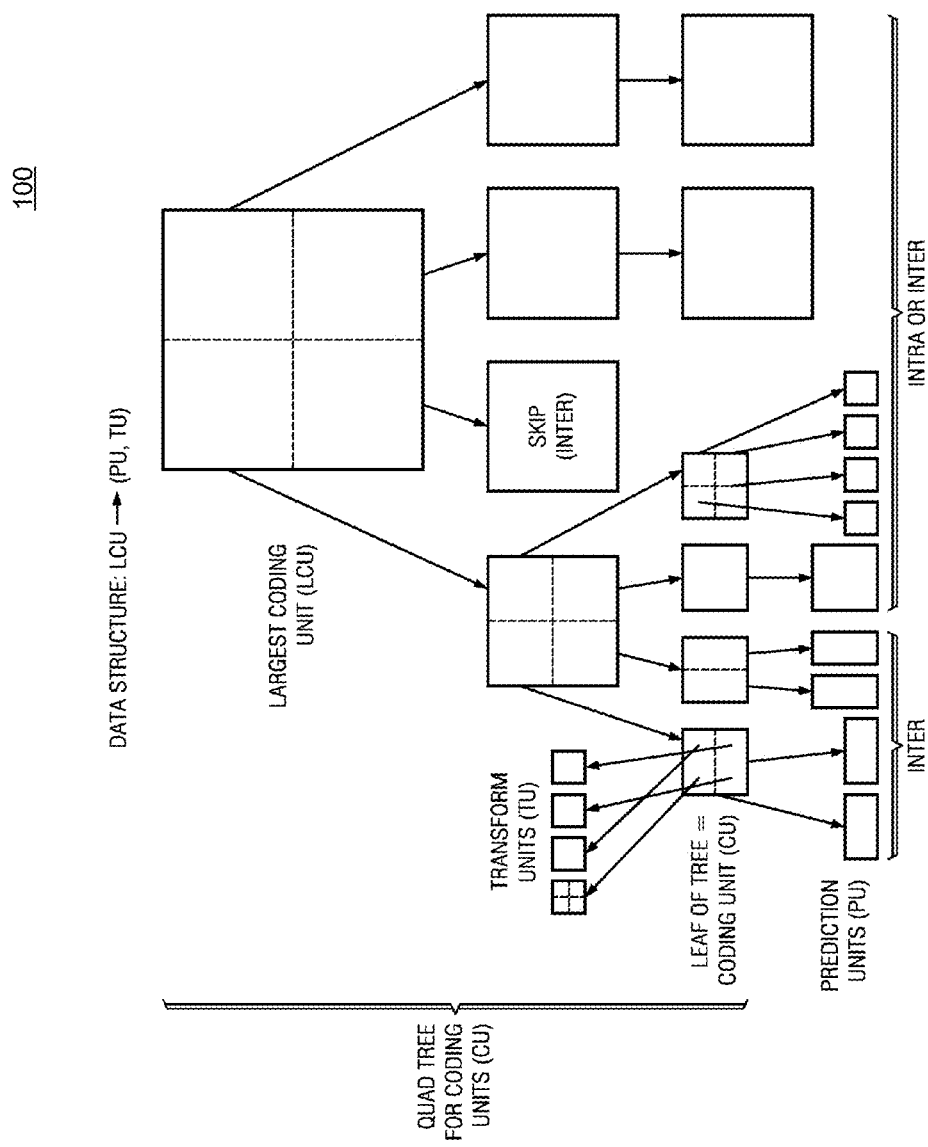
FIG. 1 is an illustration of an example relationship between a largest coding unit (LCU), coding units (CUs), prediction units (PUs), and transform units (TUs).

FIG. 1 is an illustration of an example relationship 100 between an LCU, CUs, PUs, and TUs. As described above, the HEVC video frame is divided into non-overlapped LCUs. The LCU is split into a number of CUs, terminal CUs can be split into PUs for intra prediction or motion compensated inter prediction, and TUs for transformation.

Codec System

Figure 2:
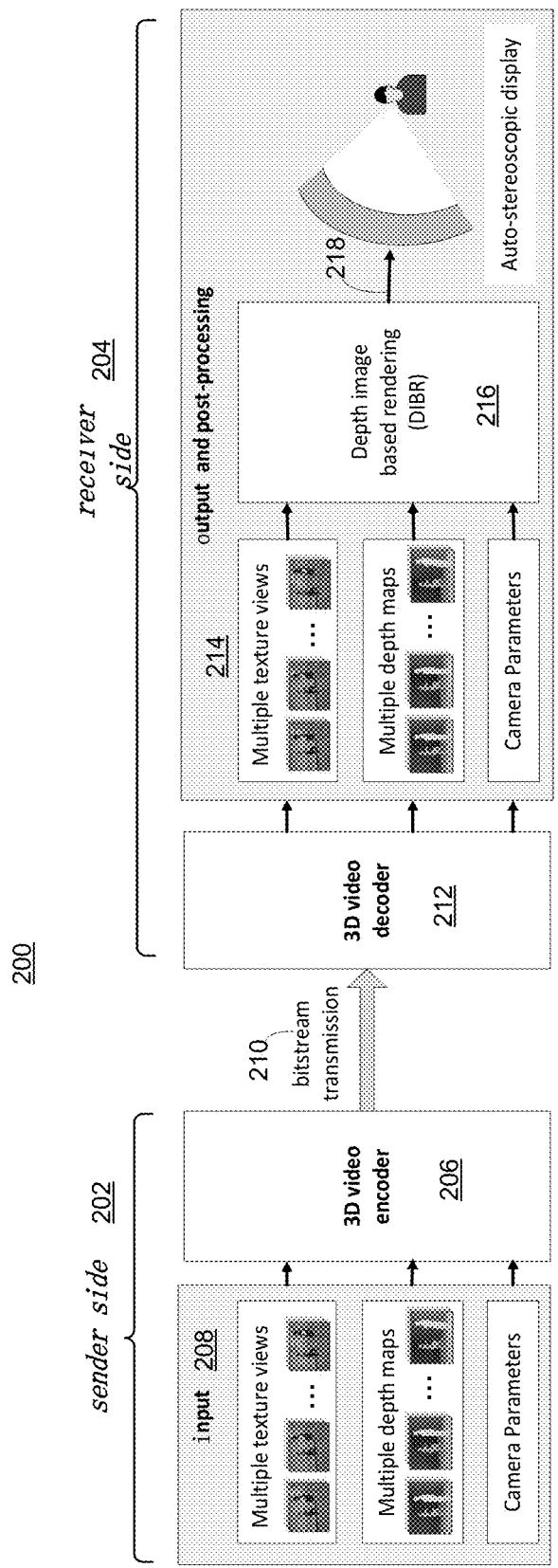
FIG. 2 is a block diagram of an example three-dimensional (3D) video coding (3DVC) codec system in which prediction parameter inheritance (PPI) may be used to encode and decode 3D video.

FIG. 2 is a block diagram of an example 3DVC codec system 200 in which prediction parameter inheritance (PPI) may be used to encode and decode video. Codec system 200 may operate in accordance with HEVC. 3DVC is based on a Video plus Depth (MVD) construct to represent 3D video content. MVD includes multiple views of video (referred to herein as multi-view video). Each view represents video captured from a different camera perspective, e.g., angle, height, etc. Each view includes texture video and its associated depth video. The texture video includes video information for rendering a picture, including luminance and chroma samples. The depth video includes information, such as a depth map, corresponding to the texture video for forming 3D video, such as depth values on a per-pixel basis.

Codec system 200 includes a sender side 202 and a receiver side 204. Sender side 202 includes a 3D multi-view video encoder 206 to encode a 3D multi-view video 208 into an encoded bitstream 210. Encoder 206 encodes both the texture video and the depth video of the multi-view video into encoded bitstream 210. Encoder 206 also embeds or packs control and syntax-related information into the encoded bitstream, including prediction parameters used to encode the multi-view video 208, and camera parameters, such as camera angle, height, identifier, etc. Sender side 202 transmits encoded bitstream 210 to receiver side 204.

Receiver side 204 receives encoded bitstream 210. Receiver side 210 includes a 3D multi-view video decoder 212 that is complementary to encoder 206 to decode the encoded bitstream based on the embedded control and syntax-related information, to reproduce the multi-view video at 214. A depth image based rendering (DIBR) engine 216 constructs a 3D display image 218 based on decoded/reproduced video 214

Encoder

Figure 3:
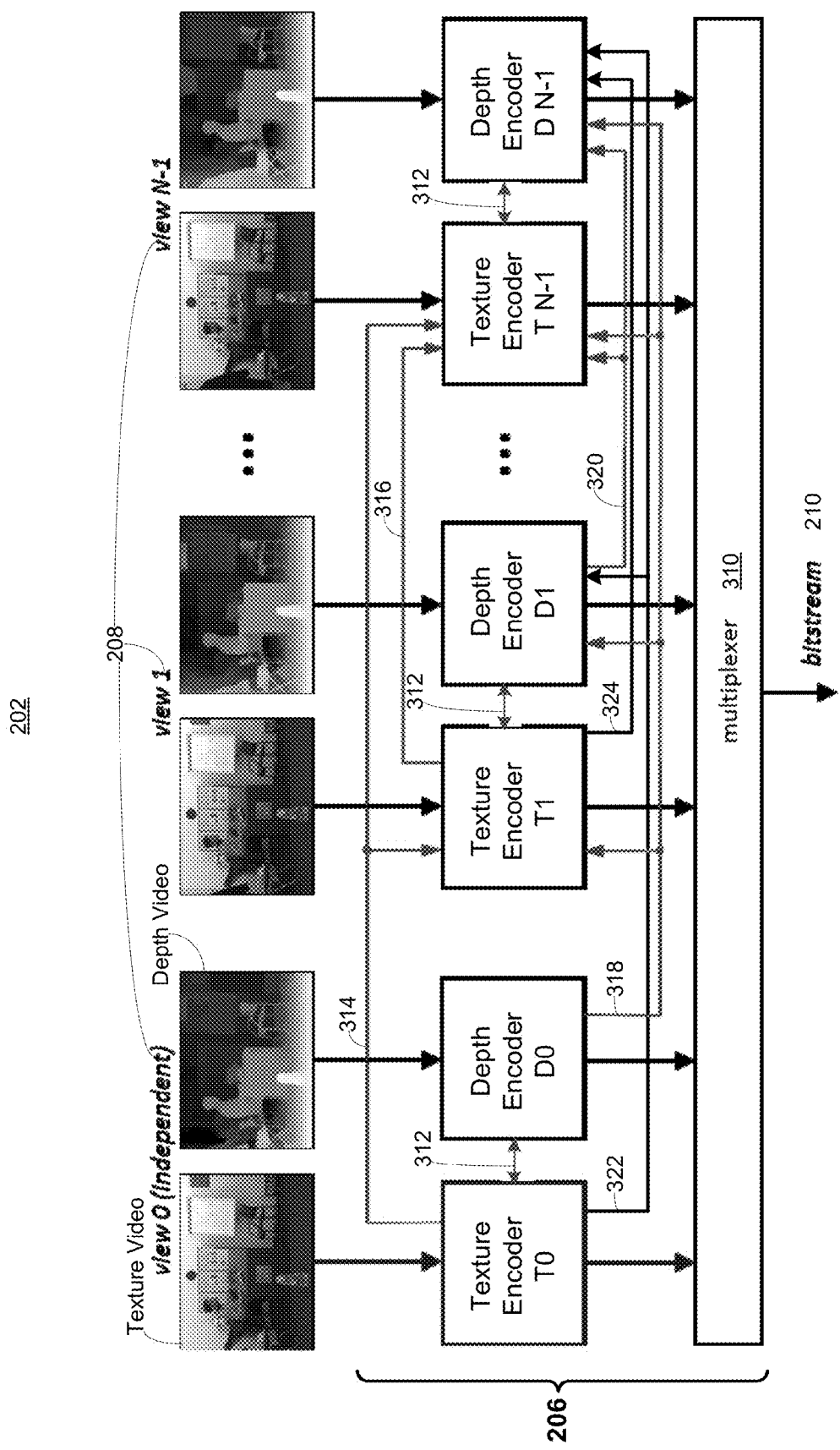
FIG. 3 is an expanded block diagram of a sender side of the codec system from FIG. 2, including a multi-view encoder, according to an embodiment.

FIG. 3 is an expanded block diagram of sender side 202 of codec system 200, including multi-view encoder 206, according to an embodiment. Depicted in FIG. 3 are multiple exemplary views view (0), view (1), and view (N-1) of 3D multi-view video 208. Each view (i) includes a texture video depicted on the left-hand side of the respective view and a depth video depicted on the right-hand side of the respective view. The terms "texture video" and "depth video" are also referred to herein, respectively, as the "texture component" and the "depth component." Associated with each view (i) is a pair of corresponding video encoders, including a texture video encoder Ti and a corresponding depth video encoder Di of encoder 206. Encoder Ti encodes the texture video of view i, while depth encoder Di encodes the depth video of view (i). For example, texture video encoder T0 encodes the texture video of view (0), while depth video encoder D0 encodes the depth video of view (0). Accordingly, encoding a given view (i) means encoding the texture video and the depth video associated with view (i). Encoders Ti, Di encode their respective views (i) using HEVC coding techniques, extended in accordance with PPI embodiments described herein. Encoders Ti and Di provide their respective encoded texture and encoded depth videos to a multiplexer 310 of encoder 206, which combines the encoded texture and depth videos from each of the encoded views into encoded bit stream 210.

View 0 is referred to as a base or independent view because view 0 is encoded independent of, i.e., without referring to, the other views. For example, view 0 may be encoded before any of the other views are encoded. The other views, e.g., view (1)-view (N-1), including their texture video and associated depth video, are referred to as dependent or auxiliary views because they may be encoded using information from other views. More specifically, embodiments described herein extend HEVC coding techniques used by encoders Ti, Di to include a flexible and inclusive, selectively applied, prediction parameter inheritance (PPI) mode (also referred to herein simply as "PPI") in which selected ones of encoders Ti, Di inherit prediction parameters from selected other ones of encoders Ti, Di in any of multiple selectable directions.

Encoder 206 selectively applies PPI so that prediction parameters used by any of encoders Ti, Di to encode their respective video blocks (whether texture or depth) may be inherited from those encoders, in any of multiple selectable PPI directions, to be used by other encoders to encode their respective video blocks. As mentioned above, the prediction parameters control the manner in which an encoder encodes, e.g., predicts, its respective video blocks. The "direction" means the direction in which prediction parameters are passed from a source (encoder/block) of the prediction parameters to a recipient (encoder/block) of the prediction parameters. The multiple selectable PPI directions include inter-view directions if the blocks/encoders are from different views, and inter-component directions if the blocks/encoders are from different ones of the texture and depth components. Also, the directions may be a combination of both inter-view and inter-component directions.

For example, to eliminate temporal and inter-view redundancies across multiple views, inter-view inter prediction may be used, where texture video and depth video are not only predicted from temporally neighboring pictures in the same view, but also from corresponding inter-view pictures in adjacent views. In other examples, inter-view intra prediction is supported. Moreover, to eliminate inter-component redundancy between the texture video and depth video, inter-component inter and intra prediction may also be applied to depth/texture video, where depth/texture videos are predicted from texture/depth video in the same view. In the inter-component example, prediction parameters are inherited between texture and depth components.

PPI also supports inheritance of prediction modes between different encoders/blocks. For example, an encoder/video block (texture or depth) may inherit prediction parameters from a corresponding, e.g., co-located, or alternatively, motion compensated, video block that is subdivided into sub-blocks, and in which:
(i) all of the sub-blocks are intra predicted;
(ii) all of the sub-blocks are inter predicted; and
(iii) the sub-blocks are hybrid predicted, i.e., some of the sub-blocks are inter predicted and some of the sub-blocks are intra predicted.

Accordingly, prediction parameters inherited in PPI include, but are not limited to: a picture encoding structure, including quadtree structures, such as quadtree split flags defining CU/PU subdivision; inter, intra, and hybrid prediction modes; partition sizes and shapes (e.g., for PUs); motion vectors and fields; inter directions; reference indices; luma inter and intra (prediction) modes, and chroma inter and intra (prediction) modes.

Encoder 206 includes multiple PPI communication paths, which comprise a PPI communication infrastructure, as depicted in FIG. 3, to support PPI in a variety of the above mentioned selectable directions:
a. in-view texture-to-depth and in-view depth-to-texture 312;
b. inter-view texture-to-texture, including independent-to-dependent 314, and dependent-to-dependent 316;
c. inter-view depth-to-depth, including independent-to-dependent 318, and dependent-to-dependent 320;
d. inter-view texture-to-depth, including independent texture-to-depth 322, and dependent texture-to-depth 324; and
e. inter-view depth-to-texture, including independent depth-to-texture 318, and dependent depth-to-texture 320.

Encoder 206 supports PPI in all of the above listed selectable directions and is capable of selecting PPI in one or more of those selectable directions at any given time, or not at all, as necessary. Thus, PPI embodiments described herein are flexible and can provide more coding gain and than if PPI is not permitted. Also, PPI reduces computational loading because inheriting prediction parameters for use in encoding reduces the computational overhead associated with deriving the prediction parameters analytically each time a video block needs to be encoded.

As described with reference to the examples above, PPI may be considered, and referred to, as inheritance of prediction parameters between encoders, wherein prediction parameters used by a first encoder to encode first video blocks are inherited from the first encoder, in any of multiple selectable PPI directions, by a second encoder, and used by the second encoder to encode second blocks using the inherited prediction parameters. Alternatively and equivalently, PPI may be considered, and referred to, as inheritance between video blocks, wherein prediction parameters used to encode first video blocks are inherited from the first video blocks in any of multiple selectable PPI directions and used to encode second video blocks.

Figure 4A:
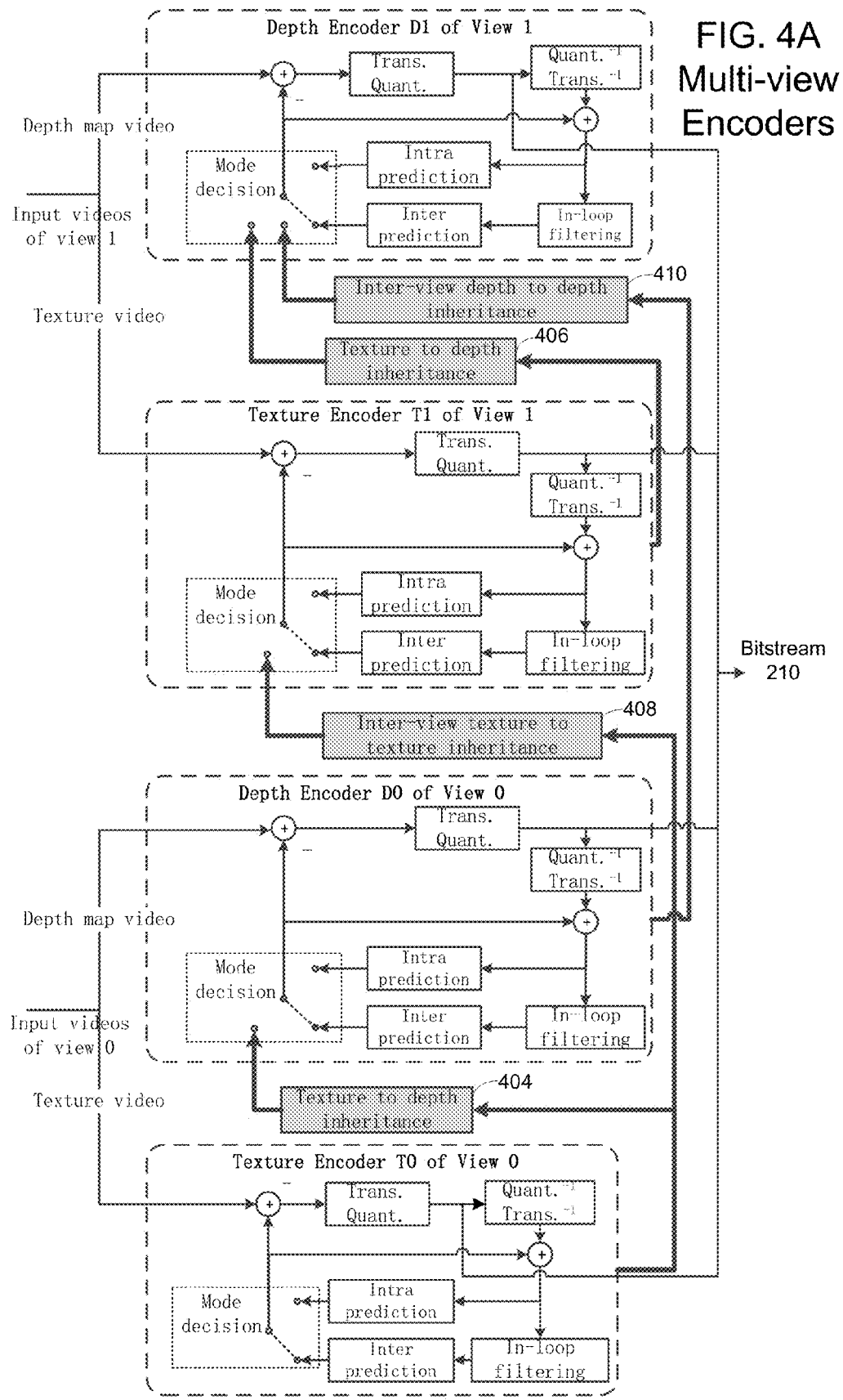
FIG. 4A is a detailed block diagram of a two-view encoder, including encoders of FIG. 3, according to an embodiment.

FIG. 4A is a detailed block diagram of a two-view encoder, including encoders T0, D0 of view (0), and encoders T1, D1 of view (1), of FIG. 3, according to an embodiment. Each of encoders T0, D0, T1, and D1 is configured to operate in substantially the same way as the other encoders to encode its respective video component, either texture or depth, into a corresponding encoded video component to be packed into bitstream 210. Each of encoders T0, D0, T1, and D1 includes known encoder modules, such as a transform quantizer, an inverse transform quantizer, an in-loop filter, intra and inter prediction modules, and adders.

In addition, each encoder includes a mode decision module configured to (i) determine whether to use/apply PPI to encode video blocks (i.e., whether to apply a PPI encoding mode), and (ii) if it is determined that PPI is to be applied, then route inherited prediction parameters to either the intra prediction module or the inter prediction module, as selected in accordance with the prediction mode indicated in the inherited prediction parameters, so that the selected prediction module can predict video blocks using the inherited prediction parameters.

To determine whether to use PPI, the mode decision module determines a set of best prediction parameters with which to encode video blocks as (i) locally derived prediction parameters, (ii) inherited prediction parameters, or (iii) a mix of locally derived and inherited parameters, based on a comparison of rate-distortion costs for the different cases (i.e., locally derived, inherited, and a mix of locally derived and inherited). If it is determined that inherited prediction parameters (either solely or in part) are the best choice, then the mode decision module invokes the PPI encoding mode (i.e., applies PPI) so that a selected one of the prediction modules inherits prediction parameters from the appropriate PPI direction. A method determining best parameters is discussed below in connection with FIG. 9B.

Encoders T0, D0, T1, and D1 encode their respective input blocks of video components into encoded blocks of video components that are then compiled into encoded bitstream 210. The encoders also embed into bitstream 210 a syntax related to PPI. The PPI syntax includes PPI flags indicating the PPI encoding mode, i.e., use of PPI. PPI flags may be used to signal the use of PPI at any of the levels of per-sequence/per-view/per-slice/per-picture/per-CU/per-PU/per-TU. PPI flags may also be used to signal the use of inter-component PPI or inter-view PPI (or a combination of both) at any of the levels of per-sequence/per-view/per-slice/per-picture/per-CU/per-PU/per-TU.

The syntax also includes one or more of the following information fields in association with the PPI flags:

Identifiers of the source encoder and the encoded video blocks from which the prediction parameters are to be inherited, including identifiers of the corresponding source view (e.g., view 0, 1, etc.) and source video component (i.e., depth or texture video). This may also include information (such as one or more encoded block identities) from which an encoded block, from where the prediction parameters are to be inherited, may be determined;

Identifiers of the recipient encoder/blocks of the inherited prediction parameters, including identifiers of the corresponding recipient view and recipient video component; and The inherited prediction parameters.

FIG. 4B is an illustration of PPI syntax 450 that may be embedded into encoded bitstream 210. PPI syntax includes PPI flags, PPI Direction (an indication of a source of the inherited parameters, such as the view, the component, the identity of one or more blocks), and Inherited Prediction Parameters.

Depicted in FIG. 4A in bolded line are exemplary selectable PPI communication or inheritance paths (corresponding to PPI communication paths depicted in FIG. 3) that support PPI in various directions between encoders T0, D0, T1, and D1. The PPI communication paths also permit inter-communication between the different per-encoder mode decision modules in support of PPI, so that a recipient encoder can communicate its decision to use PPI to an encoder that is the source of the prediction parameters to be inherited. The following communication paths are depicted in FIG. 4A:

a. in-view (i.e., same-view) texture-to-depth PPI paths 404, 406 to support an inheritance of prediction parameters in the indicated directions from texture encoder T0 to depth encoder D0, and from texture encoder T1 to depth encoder D1. For example, prediction parameters used by texture encoder T0 to encode texture video blocks may be inherited from the texture encoder (in the in-view texture-to-depth direction) by depth encoder D0, so that the depth encoder can encode depth video blocks using the inherited parameters;

b. an inter-view texture-to-texture PPI path 408, to support an inheritance of prediction parameters from texture encoder T0 to texture encoder T1; and c. an inter-view depth-to-depth PPI path 410, to support an inheritance of prediction parameters from depth encoder D0 to depth encoder D1.

The following PPI communication paths also exist, but are omitted from FIG. 4A to avoid undue complexity:

d. in-view depth-to-texture; and e. inter-view depth-to-texture.

PPI paths 404-410 route prediction parameters in the indicated directions from a source encoder/block to a recipient encoder/block. Each of pathways 404-410 includes a signal path, and a storage buffer to receive and store the prediction parameters from the source encoder for access by the recipient encoder. PPI paths 404-410 direct inherited prediction parameters from the source encoder to an input of a respective mode decision mode module in the recipient encoder. If PPI is selected/applied, then the mode decision module of the appropriate recipient encoder routes inherited prediction parameters presented at the input of the mode decision module to a selected one of the intra and inter prediction modules for use by the selected prediction module in encoding video blocks. The inherited prediction parameters included prediction modes (inter/intra) that indicate the appropriate prediction module to be used.

The PPI communication paths, along with the mode decision modules, together comprise a PPI communication infrastructure that supports PPI in the encoder.

In embodiments, the encoders may each be implemented as one or more computer program modules, including object oriented computer program module(s), which inherit prediction parameters from other ones of the encoder computer program modules.

Decoder

FIG. 5 is a detailed block diagram of an example two-view decoder system corresponding to the two-view encoder system of FIG. 4A. Each of decoders D1, T1, D0, and T0 in FIG. 5 corresponds to a respective one of encoders D1, T1, D0, and T0 of FIG. 4A, and decodes the encoded component from its paired encoder. Each of decoders T0, D0, T1, and D1 is configured to operate in substantially the same way as the other decoders to decode its respective encoded video component from received bitstream 210, either texture or depth, into a corresponding output texture video or output depth video, as appropriate. Each of encoders T0, D0, T1, and D1 includes known decoder modules, such as a transform quantizer, an inverse transform quantizer, an in-loop filter, intra and inter prediction modules, and an adder.

In addition, each decoder includes a mode decision module configured to determine PPI syntax embedded in bitstream 210 and to take appropriate actions based on the determined syntax, including (i) whether to apply PPI to decode video blocks, and, if PPI is indicated, (ii) route inherited prediction parameters to a selected one of the intra and inter prediction modules so that the selected prediction module can predict video blocks using the inherited prediction parameters.

Depicted in FIG. 5 in bolded line are exemplary selectable PPI communication paths 504, 506, 508, and 510 (corresponding to PPI communication paths 404, 406, 408, and 410 in the encoder of FIG. 4A) that support PPI in various directions between decoders T0, D0, T1, and D1. Not all supported PPI communication paths are shown in FIG. 5 so as not to add undue complexity to the figure. The PPI communication paths permit inter-communication between the different mode decision modules in support of PPI, so that a recipient decoder can communicate its decision to use PPI to a decoder that is a source of the prediction parameters to be inherited. The PPI communication paths of the decoder are configured to operate similarly to those of the encoder in FIG. 4A and, therefore, will not be described further herein. The two-view decoder supports PPI in all of the same directions supported by the encoder of FIG. 4A.

Each respective (decoder) mode decision module determines PPI syntax embedded in received bitstream 210. If PPI flags indicate PPI, then the decision module causes its respective decoder to decode its received encoded video blocks using PPI, in accordance with the PPI syntax information fields associated with the PPI flags, including the inherited prediction parameters. The mode decision module routes the prediction parameters, in a direction from the indicated source of the inherited prediction parameters, to the one of the inter and intra prediction modules in accordance with the prediction modes included in the inherited prediction parameters.

The PPI communication paths and the mode decision modules together comprise a PPI communication infrastructure that supports PPI in the decoder. The decoder PPI communication infrastructure supports all of the PPI directions supported in the encoder described above. The decoders support PPI in all of the direction listed above for the encoders, and are capable of selecting PPI in one or more of those directions at any given time, or not at all, as necessary.

In embodiments, the decoders may each be implemented as one or more computer program modules, including object oriented computer program module(s), which inherit prediction parameters from other ones of the decoder computer program modules.

The PPI syntax may indicate PPI in which prediction parameters are inherited from an inter-view component, such as depth video, or an inter-component block. If, for example, the prediction parameters are inherited from an inter-view depth component, e.g., a depth map, a corresponding block in an inter-view depth map may be retrieved using a generated disparity vector, as described below in connection with FIG. 6.

Figure 6:
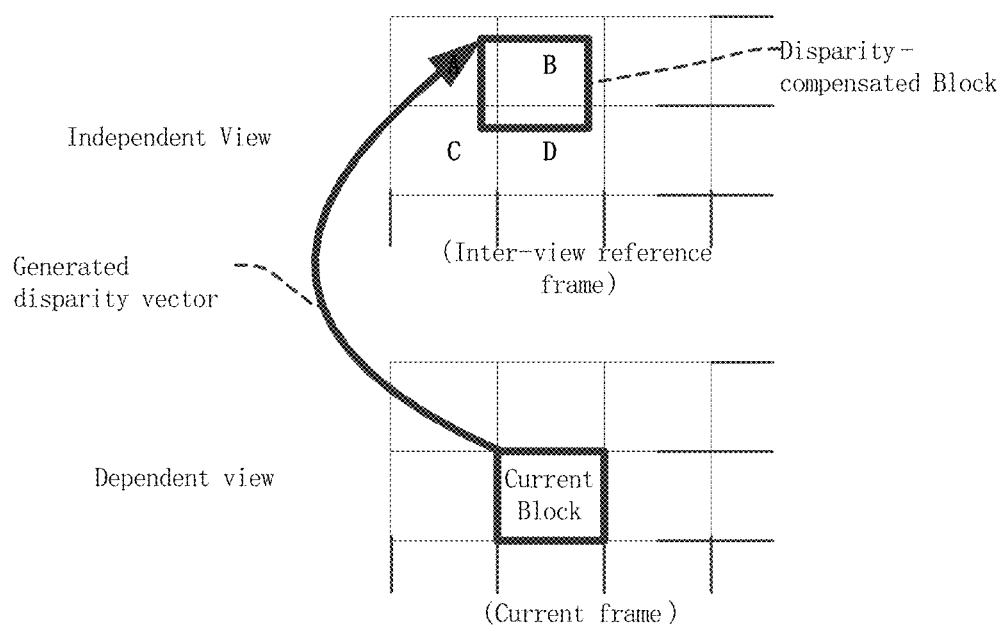
FIG. 6 is an illustration of an example generated disparity vector, generated by a decoder of FIG. 5, to determine a reference block corresponding to a current block to be decoded in inter-view PPI.

FIG. 6 is an illustration an example generated disparity vector, generated by a decoder of FIG. 5, to determine a reference block corresponding to a current block to be decoded in inter-view PPI. The generated disparity vector may be a depth-converted disparity vector, a global disparity vector, or a selective disparity vector from neighboring pre-coded blocks, etc. As a result of block-based encoding/decoding, a disparity-compensated block in the pre-coded inter-view component (see top blocks in FIG. 6), e.g., depth map, may not be a whole block. For example, the disparity compensated block may overlap more than one of multiple pre-coded blocks, indicated at A, B, C, and D in FIG. 6. Different methods may be used to select the corresponding block, including, e.g., i) the dominant overlapped block may be selected as the corresponding block, denoted as "B" in FIG. 6; ii) all of the overlapped blocks A, B, C, and D are checked for a match based on rate-distortion costs, and an optimal one of the blocks is selected based on a best rate-distortion cost. If the PPI flags indicate intra-view PPI instead of inter-view PPI, then prediction parameters are copied from (i.e., inherited from) a co-located block within the same view.

PPI Examples

FIG. 7A is a block diagram indicating PPI in various selectable directions between encoders D0, T0, D1, and T1. The selectable PPI directions, indicated by the arrows, include in-view inter-component, inter-view inter-component, and inter-view same-component. The block diagram also applies equally to PPI directions that may be applied between decoders D0, T0, D1, and T1 of FIG. 5. As indicated:
   a. a video block of D0 (of view (0)) may be encoded/decoded based on prediction parameters inherited from a video block of T0 (of view (0));
   b. a video block of T0 may inherit prediction parameters from a video block of D0;
   c. a video block of D1 may inherit prediction parameters from a selectable one of the video blocks from D0, T0, and T1;
   d. a video block of T1 may inherit prediction parameters from a selectable one of the video blocks from D0, T0, and D1.

FIG. 7B is a series of block diagrams, including, from top-to-bottom:
   (a) intra, in which blocks on the right inherit a structure and intra prediction modes from the all intra encoded blocks on the left;
   (b) inter, in which coding blocks on the right inherit a structure and inter prediction modes from the all inter encoded blocks on the left; and
   (c) hybrid, in which coding blocks on the right inherit a structure and hybrid (inter and intra) prediction modes from the hybrid encoded blocks on the left.

FIG. 7C is a block diagram of another example PPI from a hybrid-encoded source block (i.e., the left-hand block) by a current block (i.e., the right-hand block). Prediction parameters of each sub-block of the source block such as quadtree splitting (i.e., the split flags), prediction modes, partition size, motion field, inter direction, reference index, luma intra mode, and chroma intra mode could be fully or partially inherited.

PPI may be at any level of a tree-block (i.e., coding tree) hierarchy. Therefore, a source CU and a recipient CU may be at different levels in the hierarchy and have different sizes, as discussed below in connection with FIGS. 8A and 8B.

FIG. 8A is an example illustration of PPI at different levels of a coding tree hierarchy, namely, from a large CU to a small CU. In this case, PPI is indicated at a lower level of a quadtree corresponding to a size of a recipient CU ("current CU") that is smaller than a size of a source CU ("CU at higher level") that is used for the inheritance. Accordingly, the shaded block in FIG. 8A, with the same size as the current CU, is denoted as the source of the inherited signal (i.e., the source of inheritance). The prediction parameters, such as prediction modes, motion fields, inter directions, reference indices, luma intra modes, and chroma intra modes, are fully or partially inherited from the inherited signal. Also, the quadtree split flag of the current CU is set to false, and a partition size of the current CU is set to 2N×2N.

FIG. 8B another example illustration of PPI at different levels of a coding tree hierarchy, namely, from a small CU to a large CU. In this case, PPI is indicated at a lower level of a quadtree corresponding to a CU size that is smaller than the CU size that is used for the inherited signal (i.e., the source of inheritance). The shaded blocks in FIG. 8B, denoted as the inherited signal (i.e., inherited PPI source), have the same size as the current CU. The prediction parameters, such as quadtree split flags (CU/PU subdivision), prediction modes, partition sizes, motion fields, inter directions, reference indices, luma intra modes, and chroma intra modes, are fully or partially inherited from the inherited signal.

Method Flowcharts

FIG. 9A is a flowchart of an example method 900 of encoding multi-view texture and depth video/components using PPI.

905 includes receiving a distinct video block to be encoded from/of each of a texture component of a first view of multiple views of multi-view video, a depth component of the first view, a texture component of a second view of the multiple views, and a depth component of the second view. The multi-view video may be 3D multi-view video.

910 includes encoding each respective distinct video block based on a selectable one of
   prediction parameters inherited from a selectable one of the other distinct video blocks, and prediction parameters that are not inherited from one of the other distinct video blocks.

Encoding the respective distinct video block based on inherited prediction parameters may include:
a. encoding the respective video block of one of the texture and depth components of the first view based on prediction parameters inherited from the one of the other video blocks of the other one of the texture and depth components of the first view; and
b. encoding the respective video block of the one of the texture and depth components of the second view based on prediction parameters inherited from a selectable one of the other video blocks of
 the texture component of the first view
 the depth component of the first view, and
 the other one of the texture and depth components of the second view.

The inherited prediction parameters may also include:
a. inter-prediction modes if the one of the other video blocks includes coding blocks encoded based on the inter-prediction modes;
b. intra-prediction modes if the one of the other video blocks includes coding blocks encoded based on the intra-prediction modes; and
c. a combination of inter and intra prediction modes if the one of other video blocks includes coding blocks encoded based on the combination of the inter and intra modes.

915 includes generating an encoded bitstream comprising encoded video blocks of the texture and the depth components in each of the multiple views.

920 includes embedding into the encoded bitstream a PPI syntax associated with each of the encoded video blocks that was encoded based on inherited prediction parameters, the PPI syntax including a PPI flag indicating that the encoded video block was encoded based on inherited prediction parameters, information from which the one of the other video blocks from which the prediction parameters were inherited is determinable (e.g., specifically identifying the block or several candidate blocks from which the prediction parameters may have been inherited, identifying the view and component, etc.), and the inherited prediction parameters.

FIG. 9B is a flowchart of an example method expanding on the encoding at 910 of method 900.

930 includes determining whether to encode each of the respective video blocks based on a set of inherited prediction parameters or on a set of prediction parameters that are not inherited. The determining of 930 may be performed by the mode decision modules in each of encoders T0, D0, T1, and D1 of the multi-view encoders of FIG. 4A, for example.

935 includes encoding the respective video block based on the set of inherited prediction parameters if it is determined to do so in 930.

940 includes encoding the respective video block based on a set of prediction parameters that are not inherited if it is determined to do so in 930.

Determining at 930 is further expanded at 950, 955, and 960.

950 includes receiving the respective video block to be encoded and candidate sets of prediction parameters with which to encode the video block, the candidate sets including sets of inherited prediction parameters and sets of prediction parameters that are not inherited prediction parameters, such as default and locally generated prediction parameters (i.e., generated in the respective one of the encoders that is to encode the respective video block).

955 includes estimating a rate-distortion cost for each of the sets of candidate prediction parameters with respect to the respective video block based on a rate-distortion cost function. Any appropriate known rate-distortion cost function may be used, such as one based quantized video signals, sum of square differences, and Lagrangian coefficients, as would be apparent to one of ordinary skill in the relevant arts.

960 includes selecting a best one of the sets of prediction parameters that minimizes the estimated rate-distortion cost.

In an embodiment, a combination of inherited and non-inherited prediction parameters may be selected, and then used to encode the respective video block, where the combination minimizes the rate-distortion cost function.

FIG. 10 is a flowchart of an example method 1000 of decoding encoded multi-view texture and depth video/components using PPI.

1005 includes receiving an encoded video block of each of a texture component of a first view of multiple views of multi-view video, a depth component of the first view, a texture component of a second view of the multiple views, and a depth component of the second view. The multi-view video may be 3D multi-view video.

1010 includes determining whether each encoded video block is associated with a PPI indicating that the respective encoded video block was encoded based on inherited prediction parameters.

1015 includes decoding the respective encoded video block based on prediction parameters inherited from a selectable one of the other encoded video blocks indicated in the PPI syntax, if inherited prediction parameters are indicated for the respective encoded video block.

1020 includes decoding the respective encoded video block based on prediction parameters that are not inherited if inherited prediction parameters are not indicated.

Embodiments of PPI in encoders and decoders include/provide one or more of the following:

1. A mechanism to perform prediction parameter inheritance to 3D video coding to improve the performance of a 3D video codec;
2. A mechanism to selectively apply PPI in a specific sequence/view/slice/picture/CU/PU/TU level;
3. A mechanism to adaptively apply PPI as an additional coding mode, i.e., the PPI coding mode. A per-sequence/per-view/per-slice/per-picture/per-CU/per-PU/per-TU flag can be used to signal whether PPI is applied to the sequence/view/slice/picture/CU/PU/TU, and the decision to use PPI may be made based on a rate-distortion cost analysis;
4. A mechanism to adaptively and selectively apply PPI from inter-component or inter-view directions. In this case, a per-sequence/per-view/per-slice/per-picture/per-CU per-PU/per-TU flag can be used to signal if the prediction parameters are inherited from either inter-component texture or inter-view texture/depth directions, and the decision to apply the PPI may be made based on a rate-distortion cost analysis;
5. A mechanism to perform PPI to improve independent/dependent depth map coding, and/or dependent texture video encoding. The inheritance direction may be texture-to-depth, and/or depth-to-depth, and/or texture-to-texture:

A mechanism to apply PPI to independent/dependent depth map blocks, where the prediction parameters are inherited by co-located texture video blocks. An example of "co-located" is when the coordinates of a current block relative to a depth map and the coordinates of a texture block relative a texture frame are the same;

A mechanism to apply PPI to dependent depth blocks, where prediction parameters are inherited from corresponding inter-view depth blocks. The corresponding inter-view blocks can be retrieved using a generated disparity vector, such as i) a depth-converted disparity vector, ii) a global disparity vector, and iii) a selective disparity vector from neighboring pre-coded blocks. A result of block-based coding is that the disparity-compensated block in the pre-coded inter-view depth map may not be a whole block; it may overlap more than one pre-coded blocks. In this case, different methods may be used to choose a corresponding block, e.g. i) the dominant overlapped block is chosen as the corresponding block, and ii) all of the overlapped blocks are tested to determine an optimal one based on a rate-distortion cost analysis.

A mechanism to apply PPI to dependent texture blocks, where prediction parameters are inherited from corresponding inter-view texture blocks. The derivation of the corresponding blocks may use generated disparity vector, as mentioned above;

6. A mechanism to apply PPI in which sub-blocks of that are the source of the inherited signal may be coded using all-inter/all-intra/hybrid prediction. For example, an independent depth map block may inherit prediction parameters from its co-located texture video block in which a) all the sub-blocks are intra coded, b) all the sub-blocks are inter coded, and c) some sub-blocks are intra coded and some sub-blocks are inter coded; and 7. A mechanism to apply PPI at any level of a tree-block hierarchy:

If the PPI mode is indicated at a higher level of a coding tree, corresponding to a CU size that is larger than or the same as the CU size that is used for the inherited signal; and If the PPI mode is indicated at a lower level of the coding tree, corresponding to a CU size that is smaller than the CU size that is used for the inherited signal.

Computer System

Methods and systems disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, and/or a combination of integrated circuit packages. Software may include a computer readable medium encoded with a computer program including instructions to cause a processor to perform one or more functions in response thereto. The computer readable medium may include a transitory and/or non-transitory medium. The processor may include a general purpose instruction processor, a controller, a microcontroller, and/or other instruction-based processor.

FIG. 11 is a block diagram of a computer system 1100, configured to perform PPI embodiments in an encoder and a decoder, as described in one or more examples above.

Computer system 1100 includes one or more computer instruction processing units and/or processor cores, illustrated here as a processor 1102, to execute computer readable instructions, also referred to herein as computer program logic.

Computer system 1100 may include memory, cache, registers, and/or storage, illustrated here as memory 1104, which may include a non-transitory computer readable medium encoded with a computer program, illustrated here as a computer program 1106.

Memory 1104 may include data 1108 to be used by processor 1102 in executing computer program 1106, and/or generated by processor 1102 during execution of computer program 1106. Data 1108 may include multiple video including texture video and depth map components 1108a, prediction parameters 1108b, and coded components 1108c.

Computer program 1106 may include encoder instructions 1110, including PPI communication infrastructure instructions, to cause processor 1102 to encode 3D video using PPI as described in one or more examples above.

Computer program 1106 may include decoder instructions 1110, including PPI communication infrastructure instructions, to cause processor 1102 to decode code 3D video using PPI as described in one or more examples above.

In embodiments, components of system 1100 directed to encoding embodiments and components directed to decoding embodiments may reside in physically separate devices, e.g., the encoding components reside in a sender side device, while the decoding components reside in a receiver side device, as would be apparent to one having ordinary skill in the relevant arts.

Device Systems

Methods and systems disclosed herein may be implemented with respect to one or more of a variety of systems including one or more consumer systems, such as described below with reference to FIG. 12. Methods and systems disclosed herein are not, however, limited to the example of FIG. 12.

FIG. 12 illustrates an embodiment of a system 1200 in which PPI encoder and decoder embodiments described herein may be implemented. In embodiments, system 1200 may be a media system although system 1200 is not limited to this context. For example, system 1200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 1200 comprises a platform 1202 coupled to a display 1220. Platform 1202 may receive content from a content device such as content services device(s) 1230 or content delivery device(s) 1240 or other similar content sources. A navigation controller 1250 comprising one or more navigation features may be used to interact with, for example, platform 1202 and/or display 1220. Each of these components is described in more detail below.

In embodiments, platform 1202 may comprise any combination of a chipset 1205, processor 1210, memory 1212, storage 1214, graphics subsystem 1215, applications 1216 and/or radio 1218. Chipset 1205 may provide intercommunication among processor 1210, memory 1212, storage 1214, graphics subsystem 1215, applications 1216 and/or radio 1218. For example, chipset 1205 may include a storage adapter (not depicted) capable of providing intercommunication with storage 1214.

Processor 1210 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 1210 may comprise dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 1214 may comprise technology to increase the storage performance enhanced protection for valuable digital media when multiple hard drives are included, for example.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, Display Port, wireless HDMI, and/or wireless HD compliant techniques. Graphics subsystem 1215 could be integrated into processor 1210 or chipset 1205. Graphics subsystem 1215 could be a stand-alone card communicatively coupled to chipset 1205.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 1218 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In embodiments, display 1220 may comprise any television type monitor or display. Display 1220 may comprise, for example, a computer display screen, touch screen display, video monitor, television-like device, and/or a television. Display 1220 may be digital and/or analog. In embodiments, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In embodiments, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

In embodiments, content services device(s) 1230 may comprise a cable television box, personal computer, network, telephone, Internet enabled devices or appliance capable of delivering digital information and/or content, and any other similar device capable of unidirectionally or bidirectionally communicating content between content providers and platform 1202 and/display 1220, via network 1260 or directly. It will be appreciated that the content may be communicated unidirectionally and/or bidirectionally to and from any one of the components in system 1200 and a content provider via network 1260. Examples of content may include any media information including, for example, video, music, medical and gaming information, and so forth.

Content services device(s) 1230 receives content such as cable television programming including media information, digital information, and/or other content. Examples of content providers may include any cable or satellite television or radio or Internet content providers. The provided examples are not meant to limit embodiments of the invention.

In embodiments, platform 1202 may receive control signals from navigation controller 1250 having one or more navigation features. The navigation features of controller 1250 may be used to interact with user interface 1222, for example. In embodiments, navigation controller 1250 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1250 may be echoed on a display (e.g., display 1220) by movements of a pointer, cursor, focus ring, or other visual indicators displayed on the display. For example, under the control of software applications 1216, the navigation features located on navigation controller 1250 may be mapped to virtual navigation features displayed on user interface 1222, for example. In embodiments, controller 1250 may not be a separate component but integrated into platform 1202 and/or display 1220. Embodiments, however, are not limited to the elements or in the context shown or described herein.

In embodiments, drivers (not shown) may comprise technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 when the platform is turned "off" In addition, chip set 1205 may comprise hardware and/or software support for 5.1 surround sound audio and/or high definition 12.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various embodiments, platform 1202 and display 1220 may be an integrated unit. Display 1220 and content service device(s) 1230 may be integrated, or display 1220 and content delivery device(s) 1240 may be integrated, for example. These examples are not meant to limit the invention.

In various embodiments, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 12.

As described above, system 1200 may be embodied in varying physical styles or form factors.

FIG. 13 illustrates embodiments of a small form factor device 1300 in which system 1200 may be embodied. In embodiments, for example, device 1300 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 13, device 1300 may comprise a housing 1302, a display 1304, an input/output (I/O) device 1306, and an antenna 1308. Device 1300 also may comprise navigation features 1312. Display 1304 may comprise any suitable display unit for displaying information appropriate for a mobile computing device. I/O device 1306 may comprise any suitable I/O device for entering information into a mobile computing device. Examples for I/O device 1306 may include an alphanumeric keyboard, a numeric keypad, a touch pad, input keys, buttons, switches, rocker switches, microphones, speakers, voice recognition device and software, and so forth. Information also may be entered into device 1300 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed.

Various computer program product, apparatus, and method embodiments are disclosed herein.

An embodiment includes a non-transitory computer readable medium encoded with a computer program, including instructions to cause a processor to:

encode a video block from each of a texture component of a first view of multiple views of multi-view video, a depth component of the first view, a texture component of a second view of the multiple views, and a depth component of the second view;

wherein the instructions to cause the processor to encode each video block include instructions to cause the processor to encode the respective video block based on a selectable one of prediction parameters inherited from a selectable one of the other video blocks, and prediction parameters that are not inherited from one of the other video blocks.

The multi-view video may be three-dimensional (3D) multi-view video.

The instructions to cause the processor to encode the respective video block based on prediction parameters inherited from one of the other blocks may include instructions to cause the processor to:

encode the respective video block of one of the texture and depth components of the first view based on prediction parameters inherited from the one of the other video blocks of the other one of the texture and depth components of the first view; and encode the respective video block of the one of the texture and depth components of the second view based on prediction parameters inherited from a selectable one of the other video blocks of the texture component of the first view the depth component of the first view, and the other one of the texture and depth components of the second view.

The inherited prediction parameters may include:

inter-prediction modes if the one of the other video blocks includes coding blocks encoded based on the inter-prediction modes;

intra-prediction modes if the one of the other video blocks includes coding blocks encoded based on the intra-prediction modes; and a combination of inter and intra prediction modes if the one of other video blocks includes coding blocks encoded based on the combination of the inter and intra modes.

The instructions to encode may include instructions to the respective video block based on prediction parameters inherited from the one of the other video blocks, wherein the inherited prediction parameters include a quadtree structure splitting video blocks into coding units (CUs) and prediction units (PUs), sizes of the PUs, and inter and intra prediction modes used to encode the PUs.

The inherited prediction parameters may further include at least two or more of motion a motion vector, motion fields, inter directions, reference indices, luma intra modes, and chroma intra modes.

Further instructions may cause the processor to:

determine whether to encode the respective video block based on inherited prediction parameters;

encode the respective video block based on the inherited prediction parameters if it is determined to encode based on inherited prediction parameters; and encode the respective video block based on prediction parameters that are not inherited if it is determined not to encode based on inherited prediction parameters.

Further instructions may cause the processor to:

generate an encoded bitstream comprising encoded video blocks of the texture and the depth components in each of the multiple views; and embed into the encoded bitstream a prediction parameter inheritance (PPI) syntax associated with each of the encoded video blocks that was encoded based on inherited prediction parameters, the PPI syntax including a PPI flag indicating that the encoded video block was encoded based on inherited prediction parameters, information from which the one of the other video blocks from which the prediction parameters were inherited is determinable, and the inherited prediction parameters.

An apparatus embodiment, comprises:

an encoder to encode a video block from each of a texture component of a first view of multiple views of multi-view video, a depth component of the first view, a texture component of a second view of the multiple views, and a depth component of the second view;

wherein the encoder is configured to encode each respective video block based on a selectable one of prediction parameters inherited from a selectable one of the other video blocks, and prediction parameters that are not inherited from one of the other video blocks.

The multi-view video may be three-dimensional (3D) multi-view video.

The encoder may be configured to:

encode the respective video block of one of the texture and depth components of the first view based on prediction parameters inherited from the one of the other video blocks of the other one of the texture and depth components of the first view; and encode the respective video block of the one of the texture and depth components of the second view based on prediction parameters inherited from a selectable one of the other video blocks of the texture component of the first view the depth component of the first view, and the other one of the texture and depth components of the second view.

The encoder may be configured to encode the respective video block based on prediction parameters inherited from the one of the other video blocks, and wherein the inherited prediction parameters include:

inter-prediction modes if the one of the other video blocks includes coding blocks encoded by the encoder based on the inter-prediction modes;

intra-prediction modes if the one of the other video blocks includes coding blocks encoded by the encoder based on the intra-prediction modes; and a combination of inter and intra prediction modes if the one of other video blocks includes coding blocks encoded by the encoder based on the combination of the inter and intra modes.

The encoder may be configured to encode the respective video block based on prediction parameters inherited from the one of the other video blocks, and wherein the inherited prediction parameters include a quadtree structure splitting video blocks into coding units (CUs) and prediction units (PUs), sizes of the PUs, and inter and intra prediction modes used to encode the PUs.

The inherited prediction parameters may further include at least two or more of motion a motion vector, motion fields, inter directions, reference indices, luma intra modes, and chroma intra modes.

The encoder may be further configured to:

determine whether to encode the respective video block based on inherited prediction parameters;

encode the respective video block based on the inherited prediction parameters if it is determined to encode based on inherited prediction parameters; and encoding the respective video block based on prediction parameters that are not inherited if it is determined not to encode based on inherited prediction parameters.

The encoder may be further configured to:

generate an encoded bitstream comprising encoded video blocks of the texture and the depth components in each of the multiple views; and embed into the encoded bitstream a prediction parameter inheritance (PPI) syntax associated with each of the encoded video blocks that was encoded based on inherited prediction parameters, the PPI syntax including a PPI flag indicating that the encoded video block was encoded based on inherited prediction parameters, information from which the one of the other video blocks from which the prediction parameters were inherited is determinable, and the inherited prediction parameters.

The apparatus may further comprise:

communication components to communicate with a communication network;

a user interface;

a processor and memory to communicate with the communication components and the user interface; and a housing to house the encoder, the processor and memory, the communication components, and the user interface.

A method embodiment, comprises:

encoding a video block from each of a texture component of a first view of multiple views of multi-view video, a depth component of the first view, a texture component of a second view of the multiple views, and a depth component of the second view;

wherein the encoding of each video block includes encoding the respective video block based on a selectable one of prediction parameters inherited from a selectable one of the other video blocks, and prediction parameters that are not inherited from one of the other video blocks.

The multi-view video may be three-dimensional (3D) multi-view video.

The encoding the respective video block may include:

encoding the respective video block of one of the texture and depth components of the first view based on prediction parameters inherited from the one of the other video blocks of the other one of the texture and depth components of the first view; and encoding the respective video block of the one of the texture and depth components of the second view based on prediction parameters inherited from a selectable one of the other video blocks of the texture component of the first view the depth component of the first view, and the other one of the texture and depth components of the second view.

The encoding may include encoding the respective video block based on prediction parameters inherited from the one of the other video blocks, wherein the inherited prediction parameters include:

inter-prediction modes if the one of the other video blocks includes coding blocks encoded based on the inter-prediction modes;

intra-prediction modes if the one of the other video blocks includes coding blocks encoded based on the intra-prediction modes; and a combination of inter and intra prediction modes if the one of other video blocks includes coding blocks encoded based on the combination of the inter and intra modes.

The encoding may include encoding the respective video block based on prediction parameters inherited from the one of the other video blocks, wherein the inherited prediction parameters include a quadtree structure splitting video blocks into coding units (CUs) and prediction units (PUs), sizes of the PUs, and inter and intra prediction modes used to encode the PUs.

The inherited prediction parameters may further include at least two or more of motion a motion vector, motion fields, inter directions, reference indices, luma intra modes, and chroma intra modes.

The method may further comprise, prior to encoding the respective video block:

determining whether to encode the respective video block based on inherited prediction parameters;

if it is determined to encode based on inherited prediction parameters, then encoding the respective video block based on the inherited prediction parameters; and if it is determined not to encode based on inherited prediction parameters, then encoding the respective video block based on prediction parameters that are not inherited.

The method may further comprise:

generating an encoded bitstream comprising encoded video blocks of the texture and the depth components in each of the multiple views; and embedding into the encoded bitstream a prediction parameter inheritance (PPI) syntax associated with each of the encoded video blocks that was encoded based on inherited prediction parameters, the PPI syntax including a PPI flag indicating that the encoded video block was encoded based on inherited prediction parameters, information from which the one of the other video blocks from which the prediction parameters were inherited is determinable, and the inherited prediction parameters.

Another embodiment comprises a non-transitory computer readable medium encoded with a computer program, including instructions to cause a processor to:

receive an encoded video block of each of a texture component of a first view of multiple views of multi-view video, a depth component of the first view, a texture component of a second view of the multiple views, and a depth component of the second view;

determine whether each encoded video block is associated with a prediction parameter inheritance syntax (PPI) indicating that the respective encoded video block was encoded based on inherited prediction parameters; and decode the respective encoded video block based on prediction parameters inherited from a selectable one of the other encoded video blocks indicated in the PPI syntax, if inherited prediction parameters are indicated for the respective encoded video block.

The multi-view video may comprise three-dimensional (3D) multi-view video.

The instruction to cause the processor to decode may include instructions to cause the processor to:

decode the respective encoded video block of one of the texture and depth components of the first view based on prediction parameters inherited from the one of the other encoded video blocks from the other one of the texture and depth components of the first view; and decode the respective encoded video block of one of the texture and depth components of the second view based on prediction parameters inherited from a selectable one of the other encoded video blocks of the texture component of the first view the depth component of the first view, and the other one of the texture and depth components of the second view.

The inherited prediction parameters may include:

inter-prediction modes if the one of the other encoded video blocks includes coding blocks encoded based on the inter-prediction modes;

intra-prediction modes if the one of the other encoded video blocks includes coding blocks encoded based on the intra-prediction modes; and a combination of inter and intra prediction modes if the one of other encoded video blocks includes coding blocks encoded based on the combination of the inter and intra modes.

The inherited prediction parameters may include a quadtree structure splitting encoded video blocks into coding units (CUs) and prediction units (PUs), sizes of the PUs, and inter and intra prediction modes used to encode the PUs.

The inherited prediction parameters may further include at least two or more of a motion vector, motion fields, inter directions, reference indices, luma intra modes, and chroma intra modes.

The instructions to cause the processor to decode may include instructions to cause the processor to identify the one of the other encoded video blocks based on a generated disparity vector, if the PPI syntax indicates the prediction parameters are to be inherited from an encoded video block of one of the views of the multiple views that is different from the view of the respective encoded video block.

The instruction to decode may further include instructions to cause the processor to decode the respective encoded video block based on prediction parameters that are not inherited if inherited prediction parameters are not indicated.

An apparatus embodiment comprises:

a decoder configured to:

receive an encoded video block of each of a texture component of a first view of multiple views of multi-view video, a depth component of the first view, a texture component of a second view of the multiple views, and a depth component of the second view;

determine whether each encoded video block is associated with a prediction parameter inheritance syntax (PPI) indicating that the respective encoded video block was encoded based on inherited prediction parameters; and decode the respective encoded video block based on prediction parameters inherited from a selectable one of the other encoded video blocks indicated in the PPI syntax, if inherited prediction parameters are indicated for the respective encoded video block.

The decoder may be configured to:

decode the respective encoded video block of one of the texture and depth components of the first view based on prediction parameters inherited from the one of the other encoded video blocks from the other one of the texture and depth components of the first view; and decode the respective encoded video block of one of the texture and depth components of the second view based on prediction parameters inherited from a selectable one of the other encoded video blocks of the texture component of the first view the depth component of the first view, and the other one of the texture and depth components of the second view.

The inherited prediction parameters may include:

inter-prediction modes if the one of the other encoded video blocks includes coding blocks encoded based on the inter-prediction modes;

intra-prediction modes if the one of the other encoded video blocks includes coding blocks encoded based on the intra-prediction modes; and a combination of inter and intra prediction modes if the one of other encoded video blocks includes coding blocks encoded based on the combination of the inter and intra modes.

The inherited prediction parameters may include a quadtree structure splitting encoded video blocks into coding units (CUs) and prediction units (PUs), sizes of the PUs, and inter and intra prediction modes used to encode the PUs.

The inherited prediction parameters may further include at least two or more of a motion vector, motion fields, inter directions, reference indices, luma intra modes, and chroma intra modes.

The decoder may be further configured to identify the one of the other encoded video blocks based on a generated disparity vector, if the PPI syntax indicates the prediction parameters are to be inherited from an encoded video block of one of the views of the multiple views that is different from the view of the respective encoded video block.

The decoder may be further configured to decode the respective encoded video block based on prediction parameters that are not inherited if inherited prediction parameters are not indicated.

The apparatus may further comprise:

communication components to communicate with a communication network;

a user interface;

a processor and memory to communicate with the communication components and the user interface; and a housing to house the decoder, the processor and memory, the communication components, and the user interface.

A method embodiment comprises:

receiving an encoded video block of each of a texture component of a first view of multiple views of multi-view video, a depth component of the first view, a texture component of a second view of the multiple views, and a depth component of the second view;

determining whether each encoded video block is associated with a prediction parameter inheritance syntax (PPI) indicating that the respective encoded video block was encoded based on inherited prediction parameters; and decoding the respective encoded video block based on prediction parameters inherited from a selectable one of the other encoded video blocks indicated in the PPI syntax, if inherited prediction parameters are indicated for the respective encoded video block.

The decoding may include:

decoding the respective encoded video block of one of the texture and depth components of the first view based on prediction parameters inherited from the one of the other encoded video blocks from the other one of the texture and depth components of the first view; and decoding the respective encoded video block of one of the texture and depth components of the second view based on prediction parameters inherited from a selectable one of the other encoded video blocks of
   the texture component of the first view
   the depth component of the first view, and
   the other one of the texture and depth components of the second view.

The inherited prediction parameters may include:
   inter-prediction modes if the one of the other encoded video blocks includes coding blocks encoded based on the inter-prediction modes;
   intra-prediction modes if the one of the other encoded video blocks includes coding blocks encoded based on the intra-prediction modes; and
   a combination of inter and intra prediction modes if the one of other encoded video blocks includes coding blocks encoded based on the combination of the inter and intra modes.

The inherited prediction parameters may include a quadtree structure splitting encoded video blocks into coding units (CUs) and prediction units (PUs), sizes of the PUs, and inter and intra prediction modes used to encode the PUs.

The inherited prediction parameters may further include at least two or more of a motion vector, motion fields, inter directions, reference indices, luma intra modes, and chroma intra modes.

The decoding may include identifying the one of the other encoded video blocks based on a generated disparity vector, if the PPI syntax indicates the prediction parameters are to be inherited from an encoded video block of one of the views of the multiple views that is different from the view of the respective encoded video block.

The method may further comprise decoding the respective encoded video block based on prediction parameters that are not inherited if inherited prediction parameters are not indicated.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the examples disclosed herein.

What is claimed is:

1. A non-transitory computer readable medium encoded with a computer program including instructions to cause a processor to:
   encode a video block from each of a texture component of a first view of multiple views of multi-view video, a depth component of the first view, a texture component of a second view of the multiple views, and a depth component of the second view,
   wherein the instructions to cause the processor to encode each video block include instructions to cause the processor to:
      determine whether to encode each video block based on inherited prediction parameters;
      encode the respective video block based on inherited prediction parameters if it is determined to encode based on inherited prediction parameters;
      encode the respective video block based on prediction parameters that are not inherited if it is determined not to encode based on inherited prediction parameters,
      wherein to encode the respective video block based on inherited prediction parameters or prediction parameters that are not inherited, the instructions cause the processor to predict a predicted video block for each respective video block based on a selectable one of prediction parameters inherited from a selectable one of the other video blocks, wherein the inherited prediction parameters comprise inter-prediction modes if the one of the other video blocks includes coding blocks encoded based on the inter-prediction modes, intra-prediction modes if the one of the other video blocks includes coding blocks encoded based on the intra-prediction modes, and a combination of inter and intra prediction modes if the one of other video blocks includes coding blocks encoded based on a combination of the inter and intra modes, or
      prediction parameters that are not inherited from one of the other video blocks,
   generate an encoded bitstream comprising encoded video blocks of the texture and the depth components in each of the multiple views; and
   embed into the encoded bitstream a prediction parameter inheritance (PPI) syntax associated with each of the encoded video blocks that was encoded based on inherited prediction parameters, the PPI syntax including a PPI flag indicating that the encoded video block was encoded based on inherited prediction parameters and information from which the one of the other video blocks from which the prediction parameters were inherited is determinable, wherein the encoded bitstream comprises the inherited prediction parameters.

2. The computer readable medium of claim 1, wherein the multi-view video is three-dimensional (3D) multi-view video.

3. The computer readable medium of claim 1, wherein the instructions to cause the processor to predict the predicted video block for the respective video block based on prediction parameters inherited from one of the other blocks include instructions to cause the processor to:
   predict the predicted video block for the respective video block of one of the texture and depth components of the first view based on prediction parameters inherited from the one of the other video blocks of the other one of the texture and depth components of the first view; and
   predict the predicted video block for the respective video block of the one of the texture and depth components of the second view based on prediction parameters inherited from a selectable one of the other video blocks of
      the texture component of the first view,
      the depth component of the first view, and
      the other one of the texture and depth components of the second view.

4. The computer readable medium of claim 1, wherein the instructions to predict the predicted video block include instructions to predict the video block for the respective video block based on prediction parameters inherited from the one of the other video blocks, and wherein the inherited prediction parameters include a quadtree structure splitting video blocks into coding units (CUs) and prediction units (PUs), sizes of the PUs, and inter and intra prediction modes used to encode the PUs.

5. The computer readable medium of claim 4, wherein the inherited prediction parameters further include at least two or more of motion a motion vector, motion fields, inter directions, reference indices, luma intra modes, and chroma intra modes.

6. A apparatus, comprising:
an encoder to encode a video block from each of a texture component of a first view of multiple views of multi-view video, a depth component of the first view, a texture component of a second view of the multiple views, and a depth component of the second view;
wherein the encoder is configured to:
  determine whether to encode each video block based on inherited prediction parameters;
  encode the respective video block based on inherited prediction parameters if it is determined to encode based on inherited prediction parameters;
  encode the respective video block based on prediction parameters that are not inherited if it is determined not to encode based on inherited prediction parameters,
  wherein to encode the respective video block based on inherited prediction parameters or prediction parameters that are not inherited, the encoder is configured to predict a predicted video block for each respective video block based on a selectable one of
    prediction parameters inherited from a selectable one of the other video blocks, wherein the inherited prediction parameters comprise inter-prediction modes if the one of the other video blocks includes coding blocks encoded based on the inter-prediction modes, intra-prediction modes if the one of the other video blocks includes coding blocks encoded based on the intra-prediction modes, and a combination of inter and intra prediction modes if the one of other video blocks includes coding blocks encoded based on a combination of the inter and intra modes, or
    prediction parameters that are not inherited from one of the other video blocks,
  generate an encoded bitstream comprising encoded video blocks of the texture and the depth components in each of the multiple views; and
  embed into the encoded bitstream a prediction parameter inheritance (PPI) syntax associated with each of the encoded video blocks that was encoded based on inherited prediction parameters, the PPI syntax including a PPI flag indicating that the encoded video block was encoded based on inherited prediction parameters and information from which the one of the other video blocks from which the prediction parameters were inherited is determinable, wherein the encoded bitstream comprises the inherited prediction parameters.

7. The apparatus of claim 6, wherein the multi-view video is three-dimensional (3D) multi-view video.

8. The apparatus of claim 6, wherein the encoder is configured to:
  predict the predicted video block for the respective video block of one of the texture and depth components of the first view based on prediction parameters inherited from the one of the other video blocks of the other one of the texture and depth components of the first view; and
  predict the predicted video block for the respective video block of the one of the texture and depth components of the second view based on prediction parameters inherited from a selectable one of the other video blocks of
    the texture component of the first view,
    the depth component of the first view, and
    the other one of the texture and depth components of the second view.

9. The apparatus of claim 6, wherein the encoder is configured to predict the predicted video block for the respective video block based on prediction parameters inherited from the one of the other video blocks, and wherein the inherited prediction parameters include a quadtree structure splitting video blocks into coding units (CUs) and prediction units (PUs), sizes of the PUs, and inter and intra prediction modes used to encode the PUs.

10. The apparatus of claim 9, wherein the inherited prediction parameters further include at least two or more of motion a motion vector, motion fields, inter directions, reference indices, luma intra modes, and chroma intra modes.

11. The apparatus of claim 6, further comprising:
  communication components to communicate with a communication network;
  a user interface;
  a processor and memory to communicate with the communication components and the user interface; and
  a housing to house the encoder, the processor and memory, the communication components, and the user interface.

12. A method, comprising:
encoding a video block from each of a texture component of a first view of multiple views of multi-view video, a depth component of the first view, a texture component of a second view of the multiple views, and a depth component of the second view;
wherein the encoding of each video block includes
  determining whether to encode each video block based on inherited prediction parameters;
  encoding the respective video block based on inherited prediction parameters if it is determined to encode based on inherited prediction parameters;
  encoding the respective video block based on prediction parameters that are not inherited if it is determined not to encode based on inherited prediction parameters,
  wherein encoding the respective video block based on inherited prediction parameters or prediction parameters that are not inherited comprises predicting a predicted vide block for each respective video block based on a selectable one of
    prediction parameters inherited from a selectable one of the other video blocks, wherein the inherited prediction parameters comprise inter-prediction modes if the one of the other video blocks includes coding blocks encoded based on the inter-prediction modes, intra-prediction modes if the one of the other video blocks includes coding blocks encoded based on the intra-prediction modes, and a combination of inter and intra prediction modes if the one of other video blocks includes coding blocks encoded based on a combination of the inter and intra modes, or
    prediction parameters that are not inherited from one of the other video blocks
  generating an encoded bitstream comprising encoded video blocks of the texture and the depth components in each of the multiple views; and
  embedding into the encoded bitstream a prediction parameter inheritance (PPI) syntax associated with each of the encoded video blocks that was encoded based on inherited prediction parameters, the PPI syntax including a PPI flag indicating that the encoded video block was encoded based on inherited prediction parameters and information from which the one of the other video blocks from which the prediction parameters were inherited is determinable, wherein the encoded bitstream comprises the inherited prediction parameters.

13. The method of claim 12, wherein the multi-view video is three-dimensional (3D) multi-view video.

14. The method of claim 12, wherein predicting the predicted video block for the respective video block includes:
predicting the predicted video block for the respective video block of one of the texture and depth components of the first view based on prediction parameters inherited from the one of the other video blocks of the other one of the texture and depth components of the first view; and
predicting the predicted video block for the respective video block of the one of the texture and depth components of the second view based on prediction parameters inherited from a selectable one of the other video blocks of
the texture component of the first view,
the depth component of the first view, and
the other one of the texture and depth components of the second view.

15. The method of claim 12, wherein the encoding includes predicting the predicted video block for the respective video block based on prediction parameters inherited from the one of the other video blocks, and wherein the inherited prediction parameters include a quadtree structure splitting video blocks into coding units (CUs) and prediction units (PUs), sizes of the PUs, and inter and intra prediction modes used to encode the PUs.

16. The method of claim 15, wherein the inherited prediction parameters further include at least two or more of motion a motion vector, motion fields, inter directions, reference indices, luma intra modes, and chroma intra modes.

17. A non-transitory computer readable medium encoded with a computer program including instructions to cause a processor to:
receive an encoded bitstream comprising an encoded video block of each of a texture component of a first view of multiple views of multi-view video, a depth component of the first view, a texture component of a second view of the multiple views, and a depth component of the second view, and a prediction parameter inheritance (PPI) syntax associated with each of the encoded video blocks that was encoded based on inherited prediction parameters, the PPI syntax including a PPI flag indicating that the encoded video block was encoded based on inherited prediction parameters and information from which the one of the other video blocks from which the prediction parameters were inherited is determinable, wherein the encoded bitstream comprises the inherited prediction parameters;
determine whether each encoded video block was encoded based on inherited prediction parameters;
decode the respective video block based on inherited prediction parameters if it is determined the respective video block was encoded based on inherited prediction parameters;
decode the respective video block based on prediction parameters that are not inherited if it is determined the respective video block was not encoded based on inherited prediction parameters,
wherein to decode the respective video block based on inherited prediction parameters or prediction parameters that are not inherited, the instructions cause the processor to predict a predicted video block for the respective encoded video block based on prediction parameters inherited from a selectable one of the other encoded video blocks indicated in the PPI syntax, if inherited prediction parameters are indicated for the respective encoded video block, wherein the inherited prediction parameters comprise inter-prediction modes if the one of the other video blocks includes coding blocks encoded based on the inter-prediction modes, intra-prediction modes if the one of the other video blocks includes coding blocks encoded based on the intra-prediction modes, and a combination of inter and intra prediction modes if the one of other video blocks includes coding blocks encoded based on a combination of the inter and intra modes, or based on prediction parameters that are not inherited from one of the other video blocks, if inherited prediction parameters are not indicated.

18. The computer readable medium of claim 17, wherein the multi-view video is three-dimensional (3D) multi-view video.

19. The computer readable medium of claim 17, wherein the instruction to cause the processor to decode include instructions to cause the processor to:
predict the predicted video block for the respective encoded video block of one of the texture and depth components of the first view based on prediction parameters inherited from the one of the other encoded video blocks from the other one of the texture and depth components of the first view; and
predict the predicted video block for the respective encoded video block of one of the texture and depth components of the second view based on prediction parameters inherited from a selectable one of the other encoded video blocks of
the texture component of the first view,
the depth component of the first view, and
the other one of the texture and depth components of the second view.

20. The computer readable medium of claim 17, wherein the inherited prediction parameters include a quadtree structure splitting encoded video blocks into coding units (CUs) and prediction units (PUs), sizes of the PUs, and inter and intra prediction modes used to encode the PUs.

21. The computer readable medium of claim 20, wherein the inherited prediction parameters further include at least two or more of a motion vector, motion fields, inter directions, reference indices, luma intra modes, and chroma intra modes.

22. The computer readable medium of claim 17, wherein the instructions to cause the processor to predict the predicted video block include instructions to cause the processor to identify the one of the other encoded video blocks based on a generated disparity vector, if the PPI syntax indicates the prediction parameters are to be inherited from an encoded video block of one of the views of the multiple views that is different from the view of the respective encoded video block.

23. An apparatus, comprising:
a decoder configured to:
receive an encoded bitstream comprising an encoded video block of each of a texture component of a first view of multiple views of multi-view video, a depth component of the first view, a texture component of a second view of the multiple views, and a depth component of the second view, and a prediction parameter inheritance (PPI) syntax associated with each of the encoded video blocks that was encoded based on inherited prediction parameters, the PPI syntax including a PPI flag indicating that the encoded video block was encoded based on inherited prediction parameters and information from which the one of the other video blocks from which the prediction parameters were inherited is determinable, wherein the encoded bitstream comprises the inherited prediction parameters;

determine whether each encoded video block was encoded based on inherited prediction parameters;

decode the respective video block based on inherited prediction parameters if it is determined the respective video block was encoded based on inherited prediction parameters;

decode the respective video block based on prediction parameters that are not inherited if it is determined the respective video block was not encoded based on inherited prediction parameters, wherein to decode the respective video block based on inherited prediction parameters or prediction parameters that are not inherited, the decoder is configured to predict a predicted video block for the respective encoded video block based on prediction parameters inherited from a selectable one of the other encoded video blocks indicated in the PPI syntax, if inherited prediction parameters are indicated for the respective encoded video block, wherein the inherited prediction parameters comprise inter-prediction modes if the one of the other video blocks includes coding blocks encoded based on the inter-prediction modes, intra-prediction modes if the one of the other video blocks includes coding blocks encoded based on the intra-prediction modes, and a combination of inter and intra prediction modes if the one of other video blocks includes coding blocks encoded based on a combination of the inter and intra modes, or based on prediction parameters that are not inherited from one of the other video blocks, if inherited prediction parameters are not indicated.

24. The apparatus of claim 23, wherein the multi-view video is three-dimensional (3D) multi-view video.

25. The apparatus of claim 23, wherein the decoder is configured to:
predict the predicted video block for the respective encoded video block of one of the texture and depth components of the first view based on prediction parameters inherited from the one of the other encoded video blocks from the other one of the texture and depth components of the first view; and
predict the predicted video block for the respective encoded video block of one of the texture and depth components of the second view based on prediction parameters inherited from a selectable one of the other encoded video blocks of
the texture component of the first view,
the depth component of the first view, and
the other one of the texture and depth components of the second view.

26. The apparatus of claim 23, wherein the inherited prediction parameters include a quadtree structure splitting encoded video blocks into coding units (CUs) and prediction units (PUs), sizes of the PUs, and inter and intra prediction modes used to encode the PUs.

27. The apparatus of claim 26, wherein the inherited prediction parameters further include at least two or more of a motion vector, motion fields, inter directions, reference indices, luma intra modes, and chroma intra modes.

28. The apparatus of claim 23, wherein the decoder is further configured to identify the one of the other encoded video blocks based on a generated disparity vector, if the PPI syntax indicates the prediction parameters are to be inherited from an encoded video block of one of the views of the multiple views that is different from the view of the respective encoded video block.

29. The apparatus of claim 23, further comprising:
communication components to communicate with a communication network;
a user interface;
a processor and memory to communicate with the communication components and the user interface; and
a housing to house the decoder, the processor and memory, the communication components, and the user interface.

30. A method, comprising:
receiving an encoded bitstream comprising an encoded video block of each of a texture component of a first view of multiple views of multi-view video, a depth component of the first view, a texture component of a second view of the multiple views, and a depth component of the second view, and a prediction parameter inheritance (PPI) syntax associated with each of the encoded video blocks that was encoded based on inherited prediction parameters, the PPI syntax including a PPI flag indicating that the encoded video block was encoded based on inherited prediction parameters and information from which the one of the other video blocks from which the prediction parameters were inherited is determinable, wherein the encoded bitstream comprises the inherited prediction parameters;

determining whether each encoded video block was encoded based on inherited prediction parameters;

decoding the respective video block based on inherited prediction parameters if it is determined the respective video block was encoded based on inherited prediction parameters;

decoding the respective video block based on prediction parameters that are not inherited if it is determined the respective video block was not encoded based on inherited prediction parameters, wherein decoding the respective video block based on inherited prediction parameters or prediction parameters that are not inherited comprises predicting a predicted video block for the respective encoded video block based on prediction parameters inherited from a selectable one of the other encoded video blocks indicated in the PPI syntax, if inherited prediction parameters are indicated for the respective encoded video block, wherein the inherited prediction parameters comprise inter-prediction modes if the one of the other video blocks includes coding blocks encoded based on the inter-prediction modes, intra-prediction modes if the one of the other video blocks includes coding blocks encoded based on the intra-prediction modes, and a combination of inter and intra prediction modes if the one of other video blocks includes coding blocks encoded based on a combination of the inter and intra modes, or based on prediction parameters that are not inherited from one of the other video blocks, if inherited prediction parameters are not indicated.

31. The method of claim 30, wherein the multi-view video is three-dimensional (3D) multi-view video.

32. The method of claim 30, wherein the decoding includes:
- predicting the predicted video block for the respective encoded video block of one of the texture and depth components of the first view based on prediction parameters inherited from the one of the other encoded video blocks from the other one of the texture and depth components of the first view; and
- predicting the predicted video block for the respective encoded video block of one of the texture and depth components of the second view based on prediction parameters inherited from a selectable one of the other encoded video blocks of
  - the texture component of the first view,
  - the depth component of the first view, and
  - the other one of the texture and depth components of the second view.

33. The method of claim 30, wherein the inherited prediction parameters include a quadtree structure splitting encoded video blocks into coding units (CUs) and prediction units (PUs), sizes of the PUs, and inter and intra prediction modes used to encode the PUs.

34. The method of claim 33, wherein the inherited prediction parameters further include at least two or more of a motion vector, motion fields, inter directions, reference indices, luma intra modes, and chroma intra modes.

35. The method of claim 30, wherein the decoding includes identifying the one of the other encoded video blocks based on a generated disparity vector, if the PPI syntax indicates the prediction parameters are to be inherited from an encoded video block of one of the views of the multiple views that is different from the view of the respective encoded video block.

* * * * *